(12) United States Patent
Kuwahara et al.

(10) Patent No.: US 9,164,010 B2
(45) Date of Patent: Oct. 20, 2015

(54) TORQUE DETECTION APPARATUS, ELECTRIC POWER STEERING SYSTEM AND VEHICLE

(71) Applicant: NSK Ltd., Shinagawa-ku, Tokyo (JP)

(72) Inventors: Masaki Kuwahara, Fujisawa (JP); Yasuhiro Kawai, Fujisawa (JP); Toshiyuki Onizuka, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/007,831

(22) PCT Filed: Apr. 1, 2013

(86) PCT No.: PCT/JP2013/002263
§ 371 (c)(1),
(2) Date: Sep. 26, 2013

(87) PCT Pub. No.: WO2014/064856
PCT Pub. Date: May 1, 2014

(65) Prior Publication Data
US 2015/0226627 A1    Aug. 13, 2015

(30) Foreign Application Priority Data

Oct. 23, 2012 (JP) ................................ 2012-233754
Dec. 19, 2012 (JP) ................................ 2012-276868
Dec. 19, 2012 (JP) ................................ 2012-276869

(51) Int. Cl.
- *H02P 27/06* (2006.01)
- *G01L 25/00* (2006.01)
- *B62D 5/04* (2006.01)
- *B62D 6/10* (2006.01)
- *G01L 3/00* (2006.01)

(52) U.S. Cl.
CPC .............. *G01L 25/003* (2013.01); *B62D 5/049* (2013.01); *B62D 5/0463* (2013.01); *B62D 6/10* (2013.01); *G01L 3/00* (2013.01)

(58) Field of Classification Search
CPC ...... G01L 25/003; G01L 3/00; B62D 5/0463; B62D 5/049; B62D 6/10

USPC ......................................................... 701/41–43
See application file for complete search history.

(56) References Cited

U.S. PATENT DOCUMENTS 580,883 A    4/1897    Morrison
581,238 A    4/1897    Mautz (Continued)

FOREIGN PATENT DOCUMENTS

CN    101819049 A    9/2010
JP    9-178512 A    7/1997

(Continued)

OTHER PUBLICATIONS

Corresponding International Search Report, including partial English translation dated Jun. 18, 2013 (three (3) pages).

(Continued)

*Primary Examiner* — Richard Camby
(74) *Attorney, Agent, or Firm* — Crowell & Moring LLP

(57) ABSTRACT

There are provided a torque detection apparatus with high reliability and an electric power steering system and a vehicle which use the torque detection apparatus. The torque detection apparatus (30) detects the torque based upon a difference in the terminal voltage of the pair of detection coils. In this situation, the torque detection apparatus (30) outputs two analog torque signals (analog main torque signal Tma and analog sub torque signal Tsa) to the ECU (15), and outputs to the ECU (15) a digital communication signal S in which digital torque values obtained by converting the two analog torque signals to a digital format (main torque value Tm and sub torque value Ts) and diagnosis information Diag of the torque sensor circuit are superimposed.

21 Claims, 21 Drawing Sheets

(56) References Cited

U.S. PATENT DOCUMENTS

| | | |
|---|---|---|
| 5,765,661 A | 6/1998 | Matsuoka |
| 5,789,925 A | 8/1998 | Yokotani et al. |
| 6,386,052 B1 | 5/2002 | Satoh et al. |
| 6,658,333 B2 | 12/2003 | Kawada et al. |
| 7,049,773 B2 | 5/2006 | Miyazawa et al. |
| 7,389,851 B2 | 6/2008 | Miyaura |
| 7,474,070 B2 | 1/2009 | Miyazawa et al. |
| 8,612,096 B2 * | 12/2013 | Ono ................ 701/42 |
| 2010/0198557 A1 | 8/2010 | Uemura |
| 2010/0271042 A1 | 10/2010 | Uemura |
| 2012/0031202 A1 | 2/2012 | Goto et al. |
| 2013/0145865 A1 | 6/2013 | Aoki |

FOREIGN PATENT DOCUMENTS

| | | |
|---|---|---|
| JP | 2000-355280 A | 12/2000 |
| JP | 2002-22567 A | 1/2002 |
| JP | 2006-267045 A | 10/2006 |
| JP | 2010-181260 A | 8/2010 |
| JP | 2010-190674 A | 9/2010 |
| JP | 2012-103175 A | 5/2012 |
| JP | 5051404 B2 | 10/2012 |
| WO | WO 2010/119958 A1 | 10/2010 |
| WO | WO 2012/025999 A1 | 3/2012 |

OTHER PUBLICATIONS

Japanese-language Written Opinion dated Jun. 18, 2013 (PCT/ISA/237) (four (4) pages).

Chinese Office Action dated Dec. 23, 2014 (Six(6) pages).

English-language translation of International Preliminary Report on Patentability (PCT/IB/373) with Written Opinion (PCT/IB237) dated Jun. 18, 2013 (eight (8) pages).

English Translation of document C1 (International Search Report) previously filed on Sep. 26, 2013 (two (2) pages).

* cited by examiner

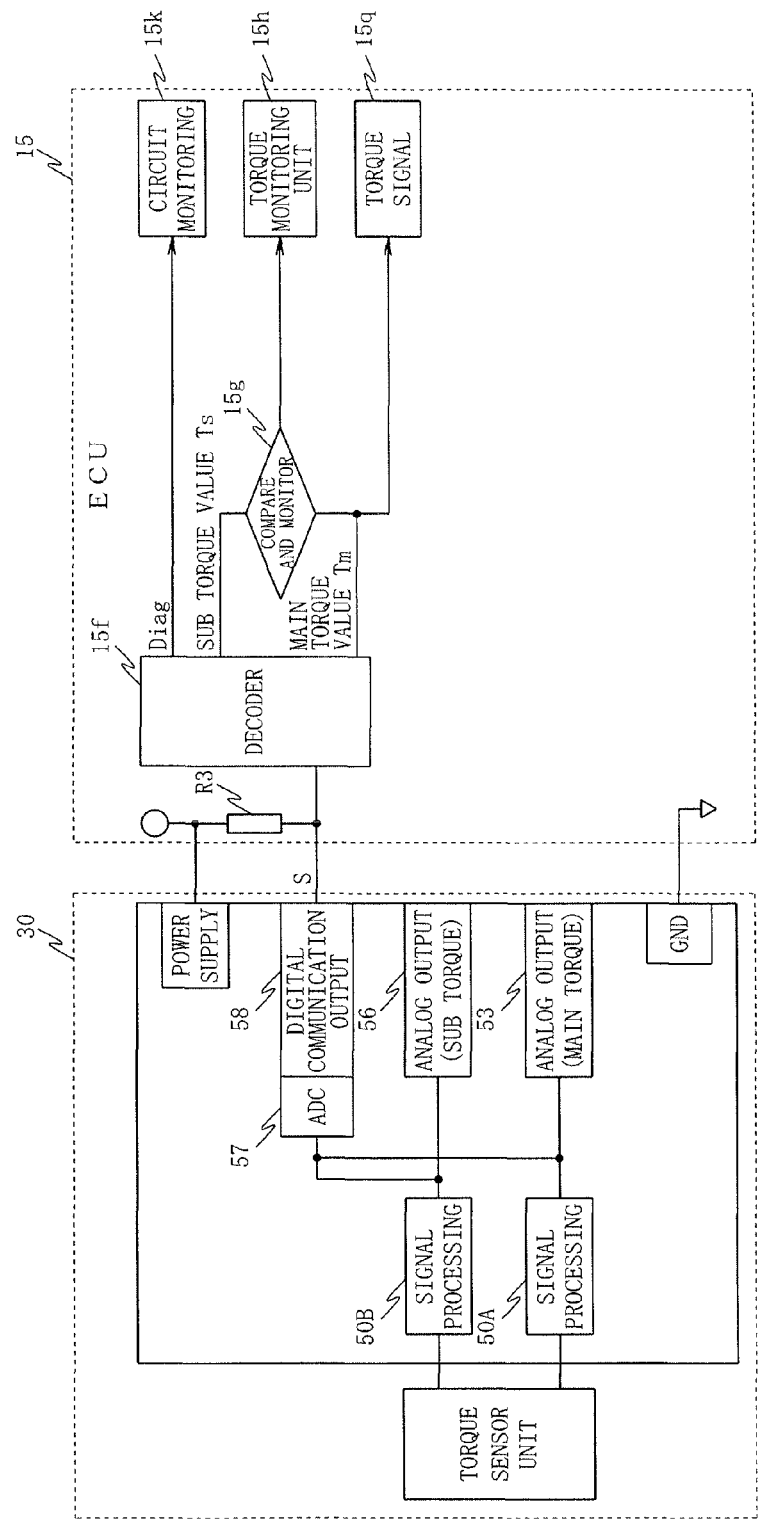

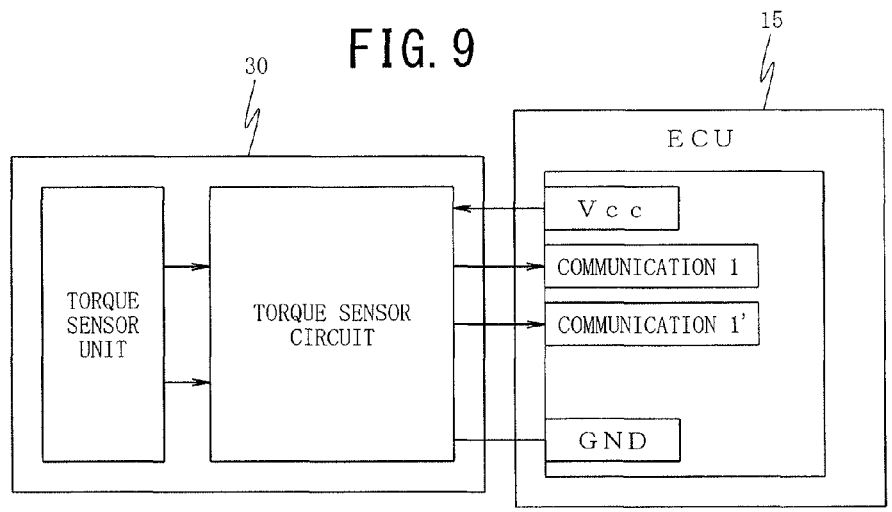
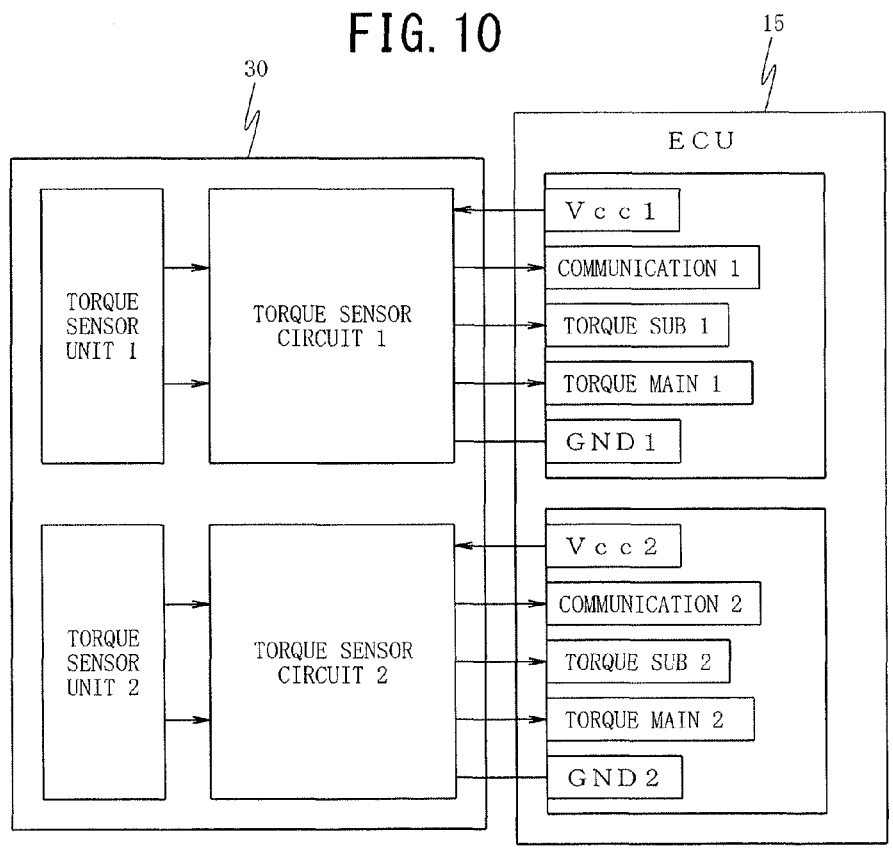

TORQUE DETECTION APPARATUS, ELECTRIC POWER STEERING SYSTEM AND VEHICLE

TECHNICAL FIELD

The present invention relates to a torque detection apparatus provided with a torque sensor for detecting a torque which acts on a rotary shaft, and to an electric power steering system and vehicle provided with a torque detection apparatus.

BACKGROUND ART

An electric power steering system generally determines an assist force based upon a steering torque detected by a torque sensor and controls driving of an electric motor.

As an abnormality detection device of a conventional torque sensor, for example, there is the art described in Patent Document 1. In the art, the torque sensor is provided with an abnormality determination unit and a switch unit which turns off when the abnormality determination unit determines there is an abnormality so that an abnormality detection signal is sent from the torque sensor to the ECU through a harness. In this situation, as the abnormality detection signal, a voltage signal which exhibits an L potential when normal and which exhibits an H potential when abnormal is used.

PRIOR ART DOCUMENTS

Patent Document

Patent Document 1: JP 2002-22567 A

SUMMARY OF THE INVENTION

Problem to be Solved

In the art described in Patent Document 1, however, even when an abnormality detection signal which shows there is an abnormality is sent, it is not possible to determine at which portion of the torque sensor circuit the abnormality has occurred. Further, if the torque sensor to the ECU is disconnected, the torque signal will not be sent to the ECU and the function of the torque sensor will be lost.

Therefore, the present invention has an object to provide a high-reliability torque detection apparatus and an electric power steering system and vehicle provided with the torque detection apparatus.

Solution to the Problem

In order to solve the above problem, according to a first aspect of the present invention, there is provided a torque detection apparatus comprising: a sensor unit which outputs a signal corresponding to a torque generated at a rotary shaft and a torque sensor circuit which detects the torque generated at the rotary shaft based upon the signal output from the sensor unit, the torque sensor circuit comprising: a signal processing unit which detects an analog main torque signal and an analog sub torque signal based upon the signal output from the sensor unit; an AD converter which converts the analog main torque signal and the analog sub torque signal detected by the signal processing unit to digital values of a main torque value and a sub torque value; a monitoring unit which monitors for an abnormality of the signal processing unit; and a communication output unit which outputs a digital communication signal in which the main torque value and sub torque value converted by the AD converter and diagnosis information including the abnormality diagnosis results by the monitoring unit are superimposed.

In this way, since the diagnosis information is superimposed onto the digital communication signal, the ECU side which receives the digital communication signal is capable of confirming an abnormality occurring at the torque sensor circuit side. In this situation, by superimposing the results of monitoring the different parts of the circuit onto the diagnosis information, the ECU side can suitably determine at which portion of the torque sensor circuit the abnormality occurs. In addition, the digital communication signal is output on a certain period. Hence, even if the digital signal line disconnection etc. occurs, the ECU side can easily recognize this.

Furthermore, since the main torque value and the sub torque value are superimposed onto the digital communication signal, even if an abnormality occurs in a signal line for use in the output of the usual torque signal and the torque signal is not normally transmitted to the ECU, it is possible to continue the function of the torque sensor. Further, the ECU side is capable of monitoring not only an abnormality by the diagnosis information, but also monitor an abnormality by comparing and monitoring the main torque value and the sub torque value. The diagnosis with high reliability is enabled.

In addition, preferably, according to a second aspect in the torque detection apparatus, the torque sensor circuit further comprises a main output unit which outputs the analog main torque signal detected by the signal processing unit.

In this way, by making the output from the torque sensor circuit to the ECU the two types of output including the analog main torque signal and the digital communication signal, the ECU side can compare and monitor not only the main torque value and sub torque value but also the analog main torque signal and main torque value, and can compare and monitor the analog main torque signal and sub torque value. Therefore, the reliability can be improved.

Further, preferably, according to a third aspect in the torque detection apparatus, the torque sensor circuit further comprises a sub output unit which outputs the analog sub torque signal detected by the signal processing unit.

Thus, it is possible to make the output from the torque sensor circuit to the ECU the three types of output of the analog main torque signal, the analog sub torque signal, and the digital communication signal. Accordingly, the ECU can compare and monitor not only the main torque value and sub torque value but also the analog main torque signal and the analog sub torque value. Therefore, the reliability can be improved.

Furthermore, preferably, according to a fourth aspect in the torque detection apparatus, the communication output unit outputs the digital communication signal through a plurality of communication signal lines.

Accordingly, even if an abnormality occurs at one of the plurality of signal lines which output a digital communication signal, the output of the digital communication signal can be continued. Therefore, it is possible to continue the abnormality monitoring function at the ECU side and possible to maintain the function as a torque sensor as well.

Moreover, preferably, according to a fifth aspect in the torque detection apparatus, the torque sensor circuit comprising: a correction use data storage unit in which data for correction of changing a processing circuit constant used in the signal processing unit and correcting an error of the analog main torque signal and the analog sub torque signal is writable; and an input/output switching unit which switches an output terminal for outputting the digital communication signal to the outside of the torque sensor circuit, to an input terminal for writing the data for correction from the outside of the torque sensor circuit to the correction use data storage unit.

In this way, as the digital communication signal line for monitoring doubles as a correction data write line, it is possible to suppress an increase in the number of signal lines with the ECU. Additionally, as the sub side torque signal line doubles as a correction data write line, even if a noise causes the torque signal line to end up switching to the correction data write function, it is possible to suppress the risk of loss of the torque signal used as the main side. Therefore, it is possible to ensure the security of the function.

Additionally, preferably, according to a sixth aspect in the torque detection apparatus, the torque sensor circuit comprising: a correction use data storage unit in which data for correction of changing a processing circuit constant used in the signal processing unit and correcting an error of the analog main torque signal and the analog sub torque signal is writable; and an input/output switching unit which switches an output terminal for outputting the analog sub torque signal to the outside of the torque sensor circuit to an input terminal for writing the data for correction from the outside of the torque sensor circuit to the correction use data storage unit.

In this way, as the analog sub torque signal line for monitoring doubles as a correction data write line, it is possible to suppress an increase in the number of signal lines with the ECU. In addition, a sub side torque signal line doubles as a correction data write line, so even if a noise causes a torque signal line to end up switching to the correction data write function, it is possible to suppress the risk of loss of the torque signal used as the main side. Therefore, it is possible to ensure the security of the function.

Further, preferably, according to a seventh aspect in the torque detection apparatus, the communication output unit comprises: a diagnosis signal generating unit which generates a diagnosis signal including the main torque value and the sub torque value converted by the AD converter and the diagnosis information, a diagnosis signal output unit which converts a data format of the diagnosis signal generated at the diagnosis signal generating unit to output as the digital communication signal; and an output abnormality detection unit which compares the diagnosis signal generated at the diagnosis signal generating unit with a signal obtained by returning the digital communication signal obtained by converting and outputting the diagnosis signal by the diagnosis signal output unit to have the same data format as the diagnosis signal before conversion, and determines that an abnormality has occurred in the diagnosis signal output unit when a result of comparison does not match.

In this way, a signal input to the diagnosis signal output unit is compared with a signal output from the diagnosis signal output unit. Thus, if an abnormality occurs at the diagnosis signal output unit, it can be suitably detected. That is, it is possible to monitor an abnormality of the communication data itself.

Further, preferably, according to an eighth aspect, the torque detection apparatus further comprises a diagnosis result output unit which outputs an output abnormality diagnosis result by the output abnormality detection unit. Therefore, it is possible to transmit the abnormality occurring at the communication data to the ECU side.

Furthermore, preferably, according to a ninth aspect, the torque detection apparatus further comprises an initial diagnosis unit which, before the torque detection function by the torque detection circuit operates, receives two different signals diagnosis, instead of the two signals compared by the output abnormality detection unit, and confirms that the output abnormality detection unit is operating normally by the output abnormality detection unit diagnosing the input signal for the abnormality. Thus, the abnormality of the output abnormality detection unit can be monitored. Therefore, the reliability abnormality can be diagnosed.

Further, preferably, according to an eighth aspect, in the torque detection apparatus, the signals for diagnosis are signals in which the diagnosis signal generated by the diagnosis signal generating unit and the digital communication signal obtained by converting and outputting an inverted signal of the diagnosis signal by the diagnosis signal output unit are returned to the same data format as the diagnosis signal before conversion. Thus, the signals for diagnosis for the output abnormality detection unit operating normally can be input for the initial diagnosis in a suitable manner.

Moreover, preferably, according to an eleventh aspect, in the torque detection apparatus, the diagnosis signal output unit is built into a custom IC, and further comprising a terminal abnormality detection unit which feeds back the digital communication signal output from the diagnosis signal output terminal of the custom IC, from a feedback terminal of the custom IC into the custom IC to compare with the digital communication signal before output from the diagnosis signal output terminal. Thus, if an abnormality such as line disconnection, a supply fault, a ground fault, or another abnormality or the like occurs at the terminal for outputting the communication data, it is possible to detect it suitably.

In addition, preferably, according to a twelfth aspect, in the torque detection apparatus, the sensor unit comprises: a pair of detection coils in which impedances are changed in opposite directions to each other in accordance with a torque generated at the rotary shaft; a plurality of excitation signal generation units, each having an identical configuration, for generating excitation signals to be supplied to a bridge circuit comprising resistors serially connected to the detection coils; an excitation signal selection unit which selects any one of the plurality of excitation signals generated by the plurality of excitation signal generation units to supply to the bridge circuit; and an abnormality detection unit which compares the plurality of excitation signals generated at the plurality of excitation signal generation units to determine that an abnormality has occurred in an excitation signal when the plurality of excitation signals do not match.

In this way, excitation signals generated from the excitation signal generation units having an identical configuration are compared with each other. Even if a frequency abnormality or distorted waveform etc. occurs, it is possible to suitably detect the abnormality in the excitation signal.

Further, preferably, according to a thirteenth aspect, in the torque detection apparatus, at least three of the excitation signal generation units are provided, the abnormality detection unit has a plurality of comparing circuits which compare the plurality of excitation signals generated by the excitation signal generation unit two by two and identifies an excitation signal at which an abnormality has occurred based upon the result of comparison by the comparing circuits, and the excitation signal selection unit selects a normal excitation signal based upon the excitation abnormality diagnosis results by the abnormality detection unit to supply to the bridge circuit.

In this way, it is possible to identify an excitation signal at which an abnormality has occurred. Therefore, it becomes possible to select a normal excitation signal to be supplied to the bridge circuit, and it becomes possible to continue the excitation function with high reliability.

Furthermore, preferably, according to an fourteenth aspect, the torque detection apparatus, further comprises an excitation signal initial diagnosis unit which, before the excitation signal generation function by the excitation signal generation unit operates, receives two different excitation signals for diagnosis instead of the two excitation signals compared by the comparing circuit of the abnormality detection unit to confirm that the abnormality detection unit is operating normally by the comparing circuit diagnosing the input signal for the abnormality. Thus, it is possible to monitor an abnormality of the abnormality detection unit itself. Therefore, it is possible to obtain a torque signal with high reliability.

Moreover, preferably, according to a fifteenth aspect, in the torque detection apparatus, the abnormality detection unit comprises an excitation diagnosis result output unit which outputs an excitation abnormality diagnosis result. Thus, it is possible to transmit that an abnormality occurs at the excitation signal to the ECU side.

Additionally, preferably, according to an sixteenth aspect, in the torque detection apparatus, the sensor unit comprises an excitation signal terminal abnormality detection unit built into the custom IC, and further comprising an excitation signal terminal abnormality detection unit which feeds back the excitation signal output from the excitation signal terminal of the custom IC to the bridge circuit, from a feedback terminal of the custom IC into the custom IC to compare with the excitation signal before output from the excitation signal terminal to the bridge circuit. Thus, if an abnormality such as line disconnection, a supply fault, a ground fault, or another abnormality or the like occurs at the terminal for outputting the excitation signal, it is possible to detect it suitably.

In addition, preferably, according to a seventeenth aspect, in the torque detection apparatus, the excitation signal terminal abnormality detection unit comprises a terminal diagnosis result output unit which outputs an abnormality diagnosis result of the excitation signal terminal. Thus, it is possible to transmit that an abnormality occurs at the excitation signal to the ECU side.

Further, preferably, according to an eighteenth aspect, the torque detection apparatus further comprising: two pairs of the sensor units; and two torque detection systems including the torque sensor circuits corresponding to the two pairs of the sensor units. Thus, even if an abnormality occurs at any one of systems including the sensor units, it is possible for the other of the systems including the sensor units to continue the torque detection function.

Furthermore, preferably, according to a nineteenth aspect, the torque detection apparatus further comprises: a pair of the sensor units; and two torque detection systems including the torque sensor circuits, to detect the torque with any one of the torque detection systems being in an operating state. Thus, even if an abnormality occurs at any one of the torque detection systems, it is possible for the other of the torque detection systems including the sensor units to continue the torque detection function.

Moreover, according to one aspect of the present invention, there is provided an electric power steering system comprising: a torque detection apparatus according to any one of above aspects which detects a steering torque input to a steering mechanism and a motor control unit which controls driving of an electric motor to apply to the steering system a steering assistance force which reduces the steering load on the driver based upon the steering torque detected by the torque detection apparatus.

In this way, it is possible to perform the steering assistance control with the use of the torque detection systems with high reliability, thereby enabling the electric power steering system for the steering assistance control in a stable manner.

Furthermore, according to one aspect of the present invention, there is provided a vehicle which comprises the electric power steering system. Thus, the vehicle is configured to perform the steering assistance control in a stable manner.

Advantageous Effects of the Invention

The torque detection apparatus according to the present invention outputs a digital communication signal in which digital torque values and diagnosis information of a torque sensor circuit are superimposed. Hence, it is possible to suitably transmit the state of occurrence of an abnormality to the ECU and to improve the continuity of the torque detection function. For this reason, a torque sensor system with high reliability can be established.

Therefore, an electric power steering system and a vehicle provided with the above torque detection apparatus can perform the steering assistance control in a suitable manner.

BRIEF DESCRIPTION OF THE DRAWINGS

FIG. 8 is a block diagram illustrative of a configuration of an ECU according to a third embodiment;

FIG. 9 is a block diagram illustrative of a torque detection apparatus according to a fourth embodiment;

FIG. 10 is a block diagram illustrative of a torque detection apparatus according to a fifth embodiment;

DESCRIPTION OF EMBODIMENTS

Hereinafter, embodiments of the present invention will be described based on the drawings.

First Embodiment

Figure 1:
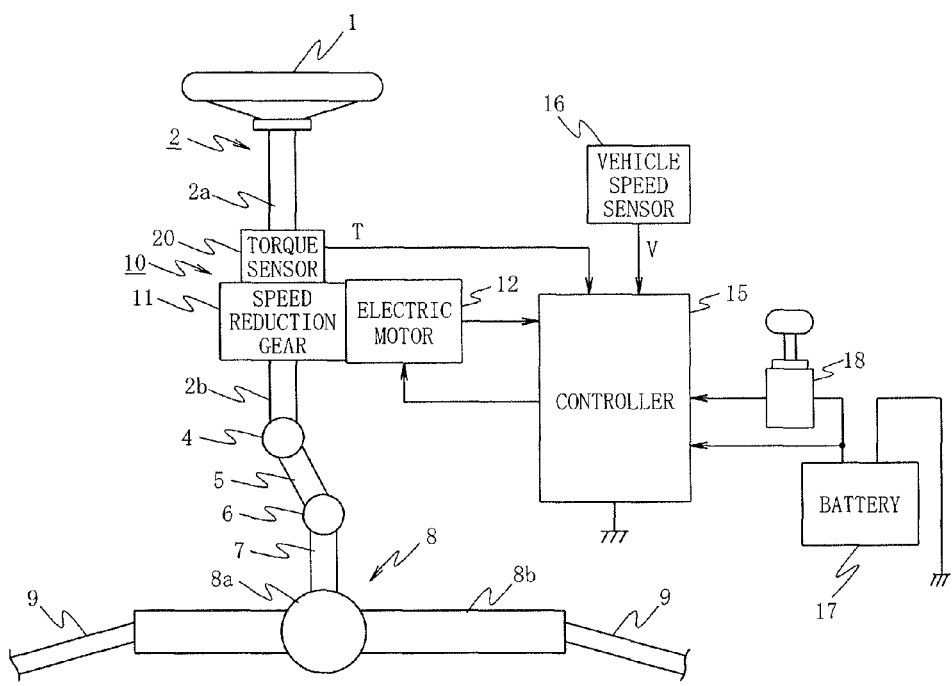
FIG. 1 is a view of an overall configuration illustrative of an electric power steering system according to the present embodiment.

FIG. 1 is a view of the overall configuration illustrative of an electric power steering system according to the present embodiment.

In the figure, reference numeral 1 is a steering wheel of a vehicle. The steering force exerted by the operation of the steering wheel 1 by the driver is transmitted to a steering shaft 2 which has an input shaft 2a and an output shaft 2b. The steering shaft 2 is connected at one end of the input shaft 2a to the steering wheel 1 and at the other end through a torque sensor 20 provided with a torque detection apparatus 30, to be described later, to one end of the output shaft 2b.

Further, the steering force transmitted to the output shaft 2b is transmitted through a universal joint 4 to an intermediate shaft 5, and is then transmitted through a universal joint 6 to a pinion shaft 7. The steering force transmitted to the pinion shaft 7 is transmitted through a steering gear 8 to a tie rod 9 whereby a steering wheel, not illustrated, is steered. In this situation, the steering gear 8 is configured as a rack and pinion type having a pinion 8a connected with the pinion shaft 7 and a rack 8b engaged with the pinion 8a to convert the rotational motion transmitted to the pinion 8a to a linear motion at the rack 8b.

At the output shaft 2b of the steering shaft 2, a steering assistance mechanism 10 which transmits an assisting steering force to the output shaft 2b is connected. The steering assistance mechanism 10 is provided with a speed reduction gear 11 connected to the output shaft 2b and an electric motor 12 connected to the speed reduction gear 11 to generate an assisting steering force for the steering system.

The torque sensor 20 is provided for detecting the steering torque applied to the steering wheel 1 and transmitted to the input shaft 2a, and is configured to detect the relative displacement between the input shaft 2a and the output shaft 2b connected by a torsion bar, not illustrated, (rotational displacement) corresponding to a change in impedance of the coil pair. The torque detection value T output from the torque sensor 20 is input to a controller 15.

The controller 15 operates with the power supplied from a vehicle-mounted battery 17 (for example, rated voltage of 12V). The negative pole of the battery 17 is grounded, while the positive pole is connected through an ignition switch 18 for starting up the engine to the controller 15, and is connected directly to the controller 15 without being connected through the ignition switch 18.

The controller 15 receives as input not only the torque detection value T but also a vehicle speed detection value V detected by a vehicle speed sensor 16 to perform steering assistance control that applies a steering assist force in response thereto to the steering system. Specifically, a steering assistance torque command value for causing the electric motor 12 to generate the above steering assist force is calculated by a known routine, and such calculated steering assistance torque command value and the motor current detection value are used for feedback control of the drive current to be supplied to the electric motor 12.

Next, the configuration of the torque detection apparatus 30 will be described in detail.

Figure 2:
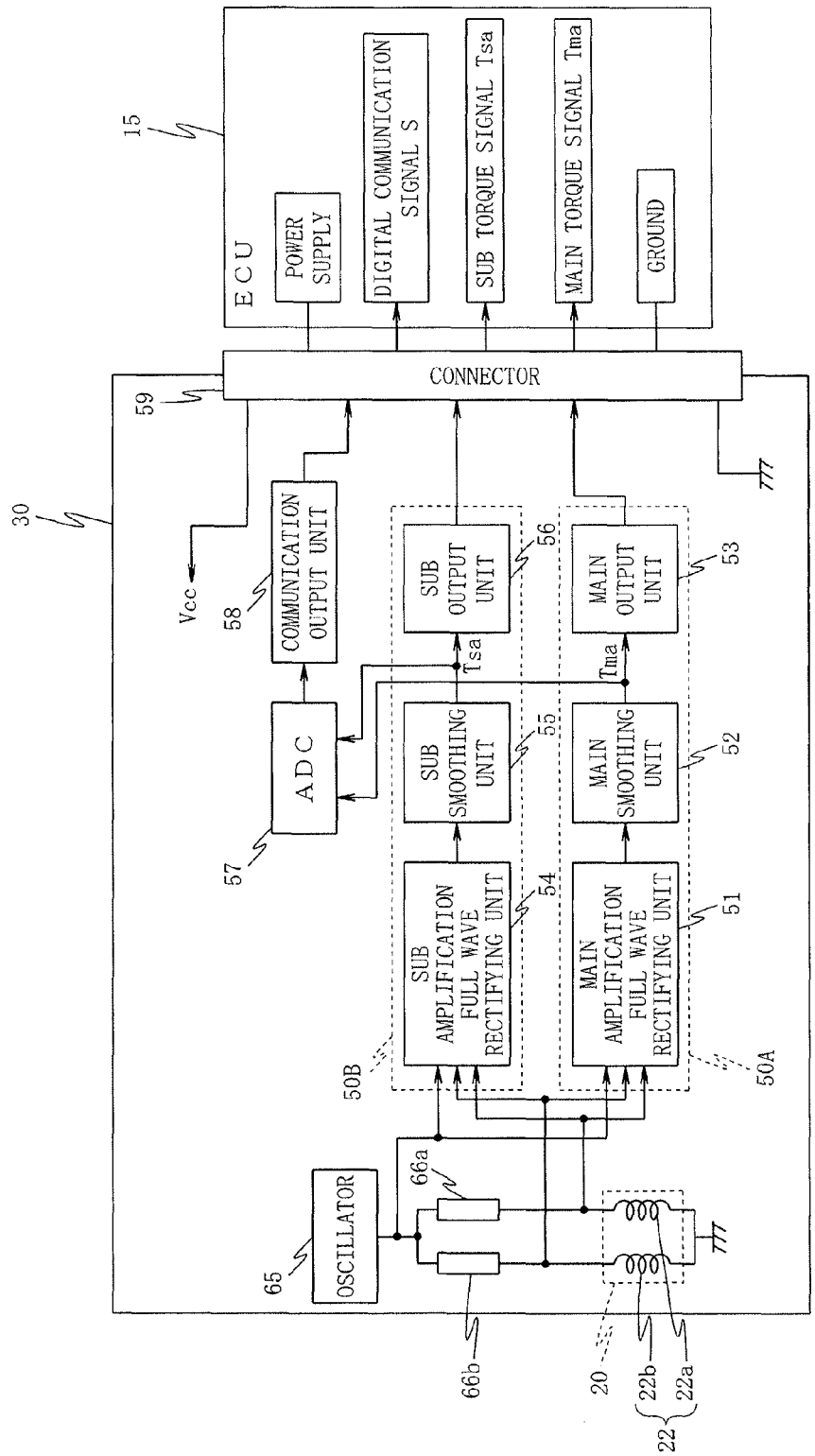
FIG. 2 is a block diagram illustrative of a configuration of a torque detection apparatus.

FIG. 2 is a block diagram illustrative of the configuration of a torque detection apparatus 30. The torque detection apparatus 30 is provided with the above-mentioned torque sensor 20. The torque sensor 20 is provided with a coil pair 22 configured by combining a pair of coils 22a and 22b of the same specifications.

Figure 3:
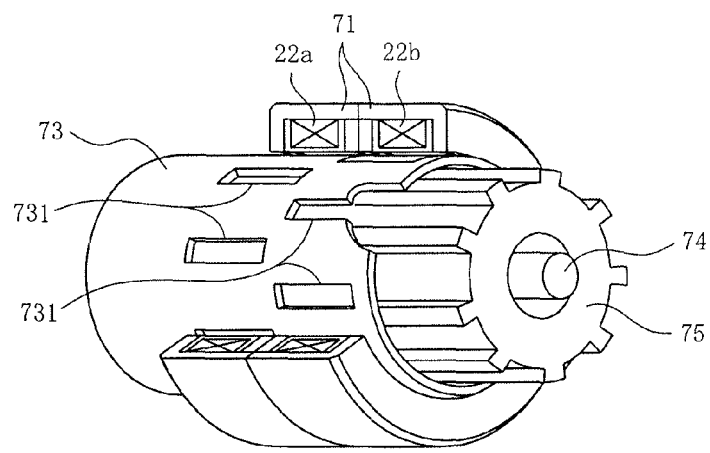
FIG. 3 is a view of a periphery of a coil constituting a torque sensor.

This torque sensor 20, as illustrated by the view of the surroundings of the coils in FIG. 3, includes a yoke 71, a tubular member 73, a plurality of windows 731 provided in the outer circumference of the tubular member 73 to face the coil pair 22, a torsion bar 74, and a sensor shaft 75. It is to be noted that, the torsion bar 74, the sensor shaft 75, and the input shaft 2a and output shaft 2b of the steering shaft are coaxially arranged. The coils 22a and 22b constituting the coil pair 22 are, as illustrated in FIG. 3, arranged inside the tubular shaped yoke 71.

In this situation, the coil pair 22 is connected to an oscillation unit 65. The oscillation unit 65 is used to supply an excitation current as an AC signal to the coils 22a and 22b constituting the coil pair 22.

One terminals of the coils 22a and 22b constituting the coil pair 22 are connected through electrical resistors 66a and 66b to the oscillation unit 65. Further, the other terminals of the coils 22a and 22b are grounded. The output signals of the coil pair 22 are the terminal voltages of the coils 22a and 22b. The output signals are output to signal processing circuits 50A and 50B.

The signal processing circuit 50A is provided with a main amplification full wave rectifying unit 51 and a main smoothing unit 52. The signal output from the signal processing circuit 50A is input to a main output unit 53. Further, the signal processing circuit 50B is provided with a sub amplification full wave rectifying unit 54 and a sub smoothing unit 55. The signal output from the signal processing circuit 50B is input to a sub output unit 56.

Further, the torque detection apparatus 30 is additionally provided with an AD converter (ADC) 57, a communication output unit 58, and a connector 59. This torque detection apparatus 30 is connected through the connector 59 to the controller (ECU) 15.

The ECU 15 supplies power supply voltage Vcc through the connector 59 to the components of the torque detection apparatus 30. In contrast, the torque detection apparatus 30 processes the output signal from the coil pair 22 and outputs an analog main torque signal Tma, an analog sub torque signal Tsa, and a digital communication signal S, as will be described later, through the connector 59 to the ECU 15. The ECU 15 determines the occurrence of an abnormality in the torque detection apparatus 30 based upon the various input signals to perform the steering assistance control in accordance with a determination result.

It is to be noted that, the torque sensor 20, the oscillator 65, and the electrical resistors 66a and 66b constitute a torque sensor unit, while the signal processing circuits 50A and 50B, the main output unit 53, the sub output unit 56, the ADC 57, the communication output unit 58, and the connector 59 constitute a torque sensor circuit.

Hereinafter, a specific configuration of the torque sensor circuit will be described.

The main amplification full wave rectifying unit 51 receives the output signals of the coil pair 22 (terminal voltages of the coils 22a and 22b) and amplifies and rectifies the difference of these two input voltages. The main smoothing unit 52 smoothes the output waveform from the main amplification full wave rectifying unit 51, and the main output unit 53 outputs the smoothed output waveform as the analog main torque signal Tma through a noise filter, not illustrated, and the connector 59 on an analog signal line to the ECU 15.

Similarly, the sub amplification full wave rectifying unit 54 receives the output signals of the coil pair 22 (terminal voltages of the coils 22a and 22b) and amplifies and rectifies the difference of these two input voltages. The sub smoothing unit 55 smoothes the output waveform from the sub amplification full wave rectifying unit 54, and the sub output unit 56 makes outputs the smoothed output waveform as the analog sub torque signal Tsa through a noise filter, not illustrated, and the connector 59 on an analog signal line to the ECU 15.

The ADC 57 converts the analog main torque signal Tma and analog sub torque signal Tsa to digital values and outputs them as the main torque value Tm and sub torque value Ts, respectively, to the communication output unit 58.

The communication output unit 58 generates a digital communication signal S in which the main torque value Tm and sub torque value Ts which the ADC 57 output and the diagnosis information Diag are superimposed on a communication protocol, and outputs the digital communication signal S through the connector 59 on a digital signal line (communication signal line) to the ECU 15. In this situation, the "diagnosis information Diag" is a signal comparing the analog main torque signal Tma and the analog sub torque signal Tsa and showing an abnormality diagnosis result of monitoring the signal processing circuits 50A and 50B for abnormalities. It is to be noted that, the diagnosis information Diag may include the abnormality diagnosis results of the torque sensor unit and other parts of the torque detection apparatus 30.

Figure 4:
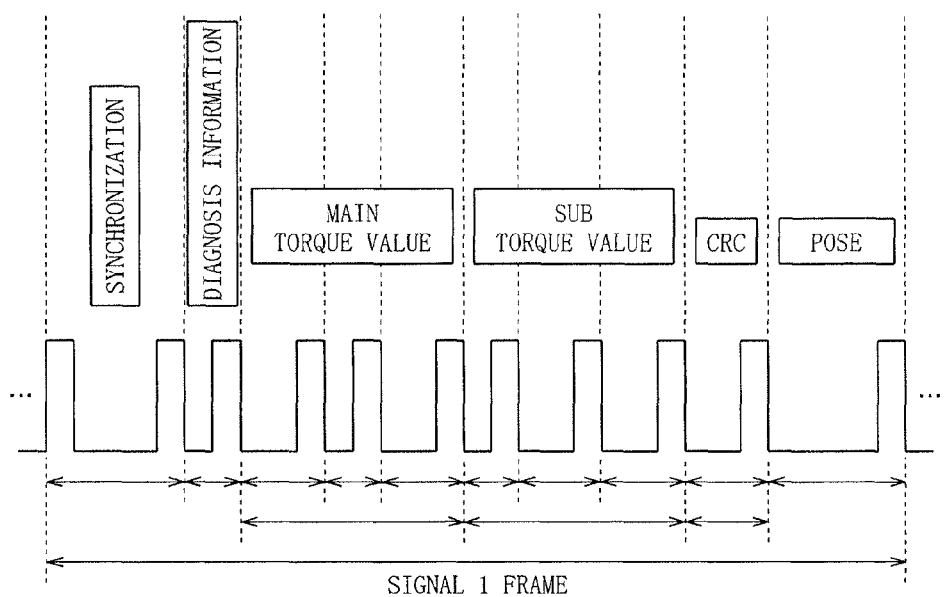
FIG. 4 is a view illustrative of a data configuration of a digital communication signal S.

In the digital communication signal S, as illustrated in FIG. 4, synchronization information is arranged at the start of one frame, and then diagnosis information including the diagnosis information Diag is successively arranged. Further, subsequently to the diagnosis information, the main torque value Tm and sub torque value Ts which are digitized by the ADC 57 are arranged. Furthermore, after that, a CRC for checking the digital communication signal S and a pose for adjusting the length of one frame are provided.

The units of one frame of communication data are successively output from the communication output unit 58 through the digital signal line to the ECU 15. That is, the main torque value Tm, the sub torque value Ts, and the diagnosis information Diag are output from the torque detection apparatus 30 to the ECU 15 on a substantially constant period.

In this way, three types of signals are output from the torque detection apparatus 30 to the ECU 15, the analog main torque signal Tma, the analog sub torque signal Tsa, and the digital communication signal S. Further, the main torque value Tm, the sub torque value Ts, and the diagnosis information Diag are superimposed onto the digital communication signal S.

Further, the ECU 15 monitors the torque detection apparatus 30 for an abnormality based upon the three types of signals input from the torque detection apparatus 30, and determines at which portion the abnormality has occurred, when an abnormality occurs.

Figure 5:
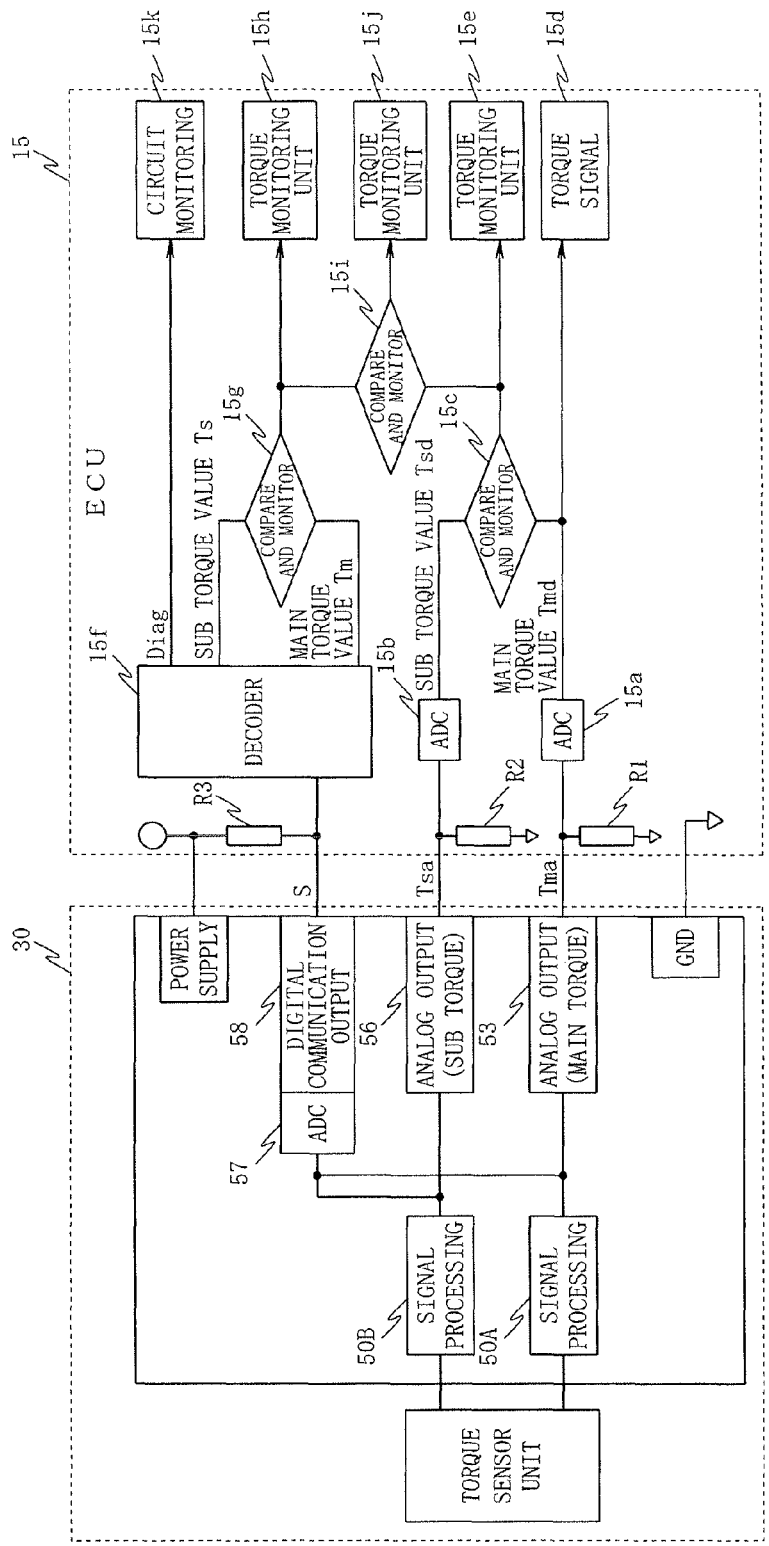
FIG. 5 is a block diagram illustrative of a configuration of an ECU according to a first embodiment.

As illustrated in FIG. 5, the ECU 15 is provided with: an ADC 15a which converts the analog main torque signal Tma to a digital value and outputs the main torque value Tmd; and an ADC 15b which converts the analog sub torque signal Tsa to a digital value and outputs the sub torque value Tsd. The main torque value Tmd and the sub torque value Tsd mean will be hereinafter referred to as "main torque value from the analog signal line" and "sub torque value from the analog signal line". The main torque value Tmd and the sub torque value Tsd are input to a comparing and monitoring unit 15c.

Further, the torque signal acquisition unit 15d normally acquires the main torque value Tmd as the torque detection value T which the final torque detection apparatus 30 detects. It is to be noted that, when it is determined that the main torque value Tmd is not a normal value, the main torque value Tm may be acquired as the torque detection value T.

The above comparing and monitoring unit 15c compares the main torque value Tmd and the sub torque value Tsd, and outputs the result to a torque monitoring unit 15e. The torque monitoring unit 15e determines the occurrence of an abnormality of the torque signals Tmd and Tsd in accordance with whether the result of comparison of the main torque value Tmd and the sub torque value Tsd is outside the normal cross characteristic.

Furthermore, the torque monitoring unit 15e monitors for an analog signal abnormality. Herein, an "analog signal abnormality" means line disconnection, short-circuiting, etc. of the analog signal line for outputting the analog main torque signal Tma and the analog sub torque signal Tsa from the torque detection apparatus 30 to the ECU 15.

The input stages of the analog torque signals Tma and Tsa are provided with pull-down resistors R1 and R2. Thus, when an analog signal abnormality occurs, the signal from the analog signal line becomes substantially 0V. Therefore, the torque monitoring unit 15e determines that an abnormality has occurred in the analog signal line of the analog main torque signal Tma when the main torque value Tmd becomes substantially 0V, and determines that an abnormality has occurred in the analog signal line of the analog sub torque signal Tma when the sub torque value Tsd becomes substantially 0V.

Further, the digital communication signal S is decoded by a decoder 15f, and then the main torque value Tm and the sub torque value Ts which had been included in the digital communication signal S are input to a comparing and monitoring unit 15g. The main torque value Tm and the sub torque value Ts will be hereinafter referred to as "main torque value from the digital signal line" and "sub torque value from the digital signal line".

The comparing and monitoring unit 15g compares the main torque value Tm and the sub torque value Ts, and outputs the result to a torque monitoring unit 15h. The torque monitoring unit 15h determines the occurrence of an abnormality of the torque signals Tm and Ts in accordance with whether the result of comparison of the main torque value Tm and the sub torque value Ts is outside the normal cross characteristic.

Furthermore, the torque monitoring unit 15h monitors for a digital signal abnormality. Herein, a "digital signal abnormality" means line disconnection, short-circuiting, etc. of the digital signal line for outputting the digital communication signal S from the torque detection apparatus 30 to the ECU 15.

The input stage of the digital communication signal S is provided with a pull-up resistor R3. When a digital signal abnormality occurs, the signal from the digital signal line becomes substantially 5V of the power source voltage. Therefore, the torque monitoring unit 15h detects an abnormality of the digital signal line when the digital communication signal S becomes substantially 5V.

Further, a comparing and monitoring unit 15i compares the main torque value Tmd or the sub torque value Tsd from the analog signal line with the main torque value Tm or the sub torque value Ts from the digital signal line, and then outputs the result to a torque monitoring unit 15j. The torque monitoring unit 15j monitors each of the torque signals for abnormality. For example, the abnormality of each torque signal is detected by monitoring if the main torque value Tmd from the analog signal line and the main torque value Tm from the digital signal line are equal, or if the main torque value Tmd from the analog signal line and the sub torque value Ts from the digital signal line fall within the normal cross characteristic.

Furthermore, a circuit monitoring unit 15k monitors the diagnosis information Diag which had been included in the digital communication signal S, and recognizes any abnormalities in the signal processing circuits 50A and 50B of the torque detection apparatus 30.

With the above configuration, when an abnormality occurs, the ECU 15 is capable of suitably determining where the abnormality has occurred. It is to be noted that, the torque detection apparatus 30 and the ECU 15 illustrated in FIG. 5 constitute a torque sensor system.

Next, the operation of the present embodiment will be described.

When the power is turned on, the torque output function of the torque detection apparatus 30 operates. At this time, the signal processing circuits 50A and 50B calculate the analog main torque signal Tma and the analog sub torque signal Tsa corresponding to the output signals of the coil pair 22, while the main output unit 53 and the sub output unit 56 output these signals through the analog signal lines to the ECU 15.

Further, the communication output unit 58 outputs a digital communication signal S including: the main torque value Tm and the sub torque value Ts in which the analog main torque signal Tma and the analog sub torque signal Tsa are digitized; and the diagnosis information Diag of the signal processing circuits 50A and 50B, through the digital signal line to the ECU 15.

In this situation, in the normal state where no abnormality has occurred in any of the torque detection apparatuses 30, the main torque value Tmd in which the analog main torque signal Tma output through the analog signal line is digitized becomes the final torque detection value T. Then, the ECU 15 performs steering assistance control based upon the torque detection value T.

Even if an abnormality occurs in the signal processing circuits 50A and 50B of the torque detection apparatus 30 from the above normal state, the digital communication signal S output from the torque detection apparatus 30 to the ECU 15 includes the diagnosis information Diag which shows that an abnormality has occurred in the signal processing circuits 50A and 50B. The diagnosis information Diag enables the circuit monitoring unit 15k of the ECU 15 to recognize that an abnormality has occurred in the signal processing circuits 50A and 50B. Therefore, in this case, it is possible to suitably shift to the fail-safe mode.

By arranging the diagnosis information Diag in the communication protocol in this way, the ECU 15 is capable of easily and suitably recognizing that an abnormality has occurred in the signal processing circuits 50A and 50B.

On the other hand, while the signal processing circuits 50A and 50B are operating normally, when an abnormality occurs in the analog signal line for transmitting the analog torque signal Tma from the torque detection apparatus 30 to the ECU 15, the analog main torque Tma becomes substantially 0V due to the pull-down resistor R2. For this reason, the main torque value Tmd digitized at the ADC 15a becomes substantially 0V. Therefore, the ECU 15 is capable of suitably determining that there is an analog signal abnormality at the torque monitoring unit 15e.

In this case, the comparing and monitoring operation using the main torque value Tmd and the sub torque value Tsd cannot be performed normally, but a comparing and monitoring operation using the main torque value Tm and the sub torque value Ts superimposed onto the digital communication signal S can be continued. Therefore, even if an analog signal abnormality occurs, high-reliability monitoring can be maintained. Further, instead of the main torque value Tmd from the analog signal line, the main torque value Tm from the digital signal line can be acquired as the torque detection value T by the final torque detection apparatus 30, so that the steering assistance control can be suitably continued.

This also applies to the case where a digital signal abnormality occurs. That is, when an abnormality occurs in a digital signal line for transmitting a digital communication signal S from the torque detection apparatus 30 to the ECU 15, the pull-up resistor R3 makes the digital communication signal S substantially 5V. Accordingly, the ECU 15 is capable of suitably determining that there is a digital signal abnormality at the torque monitoring unit 15h.

In this case, the comparing and monitoring operation using the main torque value Tm and the sub torque value Ts superimposed onto the digital communication signal S cannot be performed normally, whereas a comparing and monitoring operation using the main torque value Tmd and the sub torque value Tsd from the analog signal line can be continued. Therefore, even if a digital signal abnormality occurs, high-reliability monitoring can be maintained and suitable steering assistance control can be continued.

In this way, if an abnormality occurs in the torque detection apparatus 30, it is possible to determine at what portion the abnormality occurs. In particular, even when an abnormality occurs in the torque signal detected by the torque detection apparatus 30 before reaching the ECU 15, it is possible to suitably detect the abnormality and to continue the function as a torque sensor.

That is, since it is configured such that an ADC 57 is mounted on the torque sensor circuit, an analog torque signal is digitized by the ADC 57 and arranged at the communication protocol, and the result is output to the ECU 15 on a constant period, the ECU can easily recognize a supply fault, ground fault, line disconnection, etc. of the diagnosis signal line in the same way as when using a clocking diagnosis signal.

Further, by arranging the diagnosis information Diag in the communication protocol, the ECU 15 is capable of notifying the ECU 16 of the state in the torque sensor circuit. This makes high-reliability monitoring possible at the ECU 15 side.

Furthermore, the ECU 15 carries out two types of comparing and monitoring of the main torque value Tmd and the sub torque value Tsd from the analog signal line and two types of comparing and monitoring of the main torque value Tm and the sub torque value Ts from the digital signal line thereby making it possible to realize a torque sensor system which can continue the torque sensor function while maintaining high-reliability monitoring.

Second Embodiment

Next, a second embodiment will be described.

In the second embodiment, the output from the torque detection apparatus 30 to the ECU 15 in the above-described first embodiment further has two types of the analog main torque signal Tma and the digital communication signal S.

That is, the torque detection apparatus 30 according to the second embodiment is configured such that the sub output unit 56 in FIG. 2 is deleted.

Figure 6:
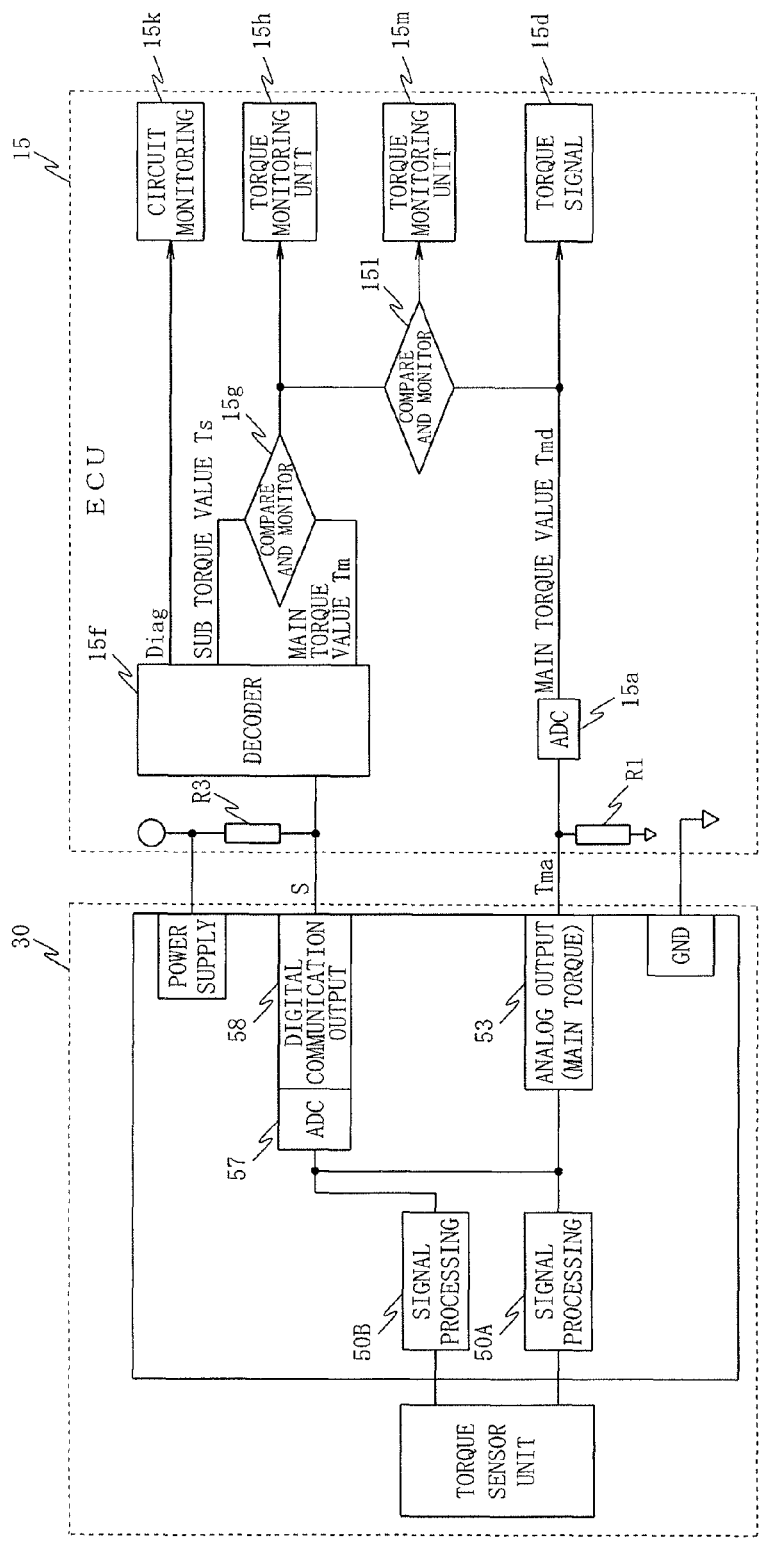
FIG. 6 is a block diagram illustrative of a configuration of an ECU according to a second embodiment.

Further, the ECU 15, as illustrated in FIG. 6, the pull-up resistor R2, the ADC 15b, the comparing and monitoring unit 15c, and the torque monitoring unit 15e are deleted in FIG. 5, and a comparing and monitoring unit 15l and a torque monitoring unit 15m are arranged instead of the comparing and monitoring unit 15i and the torque monitoring unit 15j.

The comparing and monitoring unit 15l compares and monitors the main torque value Tmd from the analog signal line and the main torque value Tm from the digital signal line, also compares and monitors the main torque value Tmd from the analog signal line and the sub torque value Ts from the digital signal line, and then outputs the results to the torque monitoring unit 15m.

The torque monitoring unit 15m monitors the torque signals for an abnormality. For example, the abnormality of each of the torque signals is detected by monitoring if the main torque value Tmd from the analog signal line and the main torque value Tm from the digital signal line are equal, if the main torque value Tmd from the analog signal line and the sub torque value Ts from the digital signal line have the normal cross characteristic, or the like.

With the above configuration, as to the analog signal abnormality and the digital signal abnormality, it is possible to detect suitably in the same way as the above-mentioned first embodiment. Further, since the two types of torque signals from the digital signal line are compared and monitored, even if an analog signal abnormality occurs, the torque detection function can be continued while maintaining high-reliability monitoring. Further, when an abnormality occurs in the digital signal line, the ECU 15 can recognize that the abnormality monitoring function of the torque sensor system is lost to shift to the fail-safe mode.

Furthermore, as the analog signal line for outputting the analog sub torque signal Tsa to the ECU 15 becomes unnecessary, the signal lines between the torque detection apparatus 30 and the ECU 15 can be reduced from five lines to four lines. Accordingly, the noise filter related components arranged on the analog signal lines can be reduced by one line. This contributes to cost reduction.

Further, when a drop in the battery voltage or the like causes the main power supply to temporarily fall, the torque signal output can be continuously output. Further, the drop in the potential of the main power supply can be notified by the communication signal line to the ECU 15.

It is to be noted that, in the second embodiment, the analog main torque signal Tma is used as the analog torque signal output from the torque detection apparatus 30 to the ECU 15, but instead, the analog sub torque signal Tsa may be output to the ECU 15.

Figure 7:
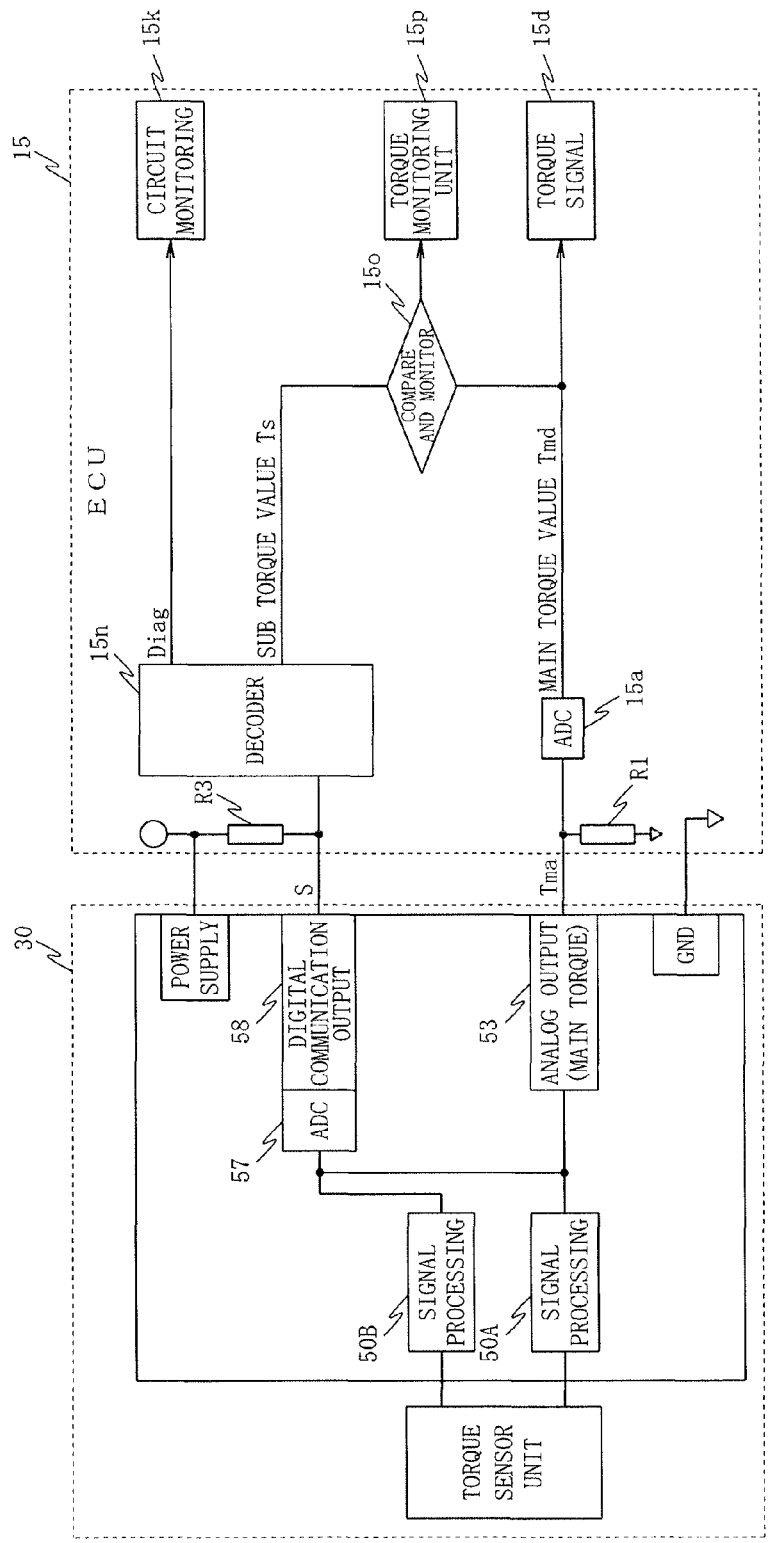
FIG. 7 is a block diagram illustrative of another example of the configuration of an ECU according to the second embodiment.

Further, in the second embodiment, as illustrated in FIG. 7, the main torque value Tm included in the digital communication signal S may not be used for comparing and monitoring. In this case, the comparing and monitoring unit 15g and torque monitoring unit 15h in FIG. 6 are deleted, a decoder 15n may be provided instead of the decoder 15f and a comparing and monitoring unit 15o and a torque monitoring unit 15p may be provided instead of the comparing and monitoring unit 15l and the torque monitoring unit 15m.

Further, the comparing and monitoring unit 15o compares and monitors the sub torque value Ts output from the decoder 15n with the main torque value Tmd from the analog signal line, and outputs the result to the torque monitoring unit 15p.

The torque monitoring unit 15p detects an abnormality in each of the torque signals. Accordingly, the monitoring function at the ECU 15 can be simplified.

Third Embodiment

Next, a third embodiment will be described.

In the third embodiment, the analog torque signal is made not to be output from the torque detection apparatus 30 in the above-described first embodiment.

That is, the torque detection apparatus 30 according to the third embodiment is configured such that the main output unit 53 and sub output unit 56 in FIG. 2 are deleted.

Further, the ECU 15, as illustrated in FIG. 8, the pull-up resistor R1, the pull-up resistor R2, the ADC 15a, the ADC 15b, the comparing and monitoring unit 15c, the torque monitoring unit 15e, the comparing and monitoring unit 15i, and the torque monitoring unit 15j in FIG. 5 are deleted, and a torque signal acquisition unit 15q is provided instead of the torque signal acquisition unit 15d.

The torque signal acquisition unit 15q acquires the main torque value Tm from the digital signal line as the torque detection value T of the final torque detection apparatus 30.

With the above configuration, a reduced line configuration is made available in which the output signal from the torque detection apparatus 30 to the ECU 15 can be made a single digital communication signal S. In this way, by superimposing the main torque value Tm and the sub torque value Ts in the digital communication signal S, it is possible to realize a torque sensor function even without output of an analog torque signal. In this case, the signal lines between the torque detection apparatus 30 and the ECU 15 can be reduced to three lines.

Further, since the diagnosis information Diag is also superimposed onto the digital communication signal S, the ECU 15 is capable of comparing and monitoring a wider range than when outputting only the main torque signal Tma and the sub torque signal Tsa from analog signal lines.

Furthermore, since this eliminate the necessity of the output from the analog torque signal to the ECU 15, thereby also eliminating the necessity of the AD converters (ADCs 15a and 15b) for digitizing the analog torque signal. For this reason, the cost can be reduced by eliminating the necessity.

Fourth Embodiment

Next, a fourth embodiment will be described.

In the fourth embodiment, a plurality of digital signal lines are provided in the above-described fourth embodiment.

That is, the torque detection apparatus 30 in the fourth embodiment is configured to output the digital communication signal S from the communication output unit 58 in FIG. 2 through a plurality of (here, two) digital signal lines to the ECU 15.

FIG. 9 is a block diagram illustrative of the configuration of the torque detection apparatus.

As illustrated in FIG. 9, four communication signal lines are provided between the torque detection apparatus 30 and the ECU 15. Among them, two (communication 1 and communication 1') are lines for outputting the digital communication signal S from the torque detection apparatus 30 to the ECU 15.

With the above configuration, when line disconnection or another abnormality occurs in one of the digital signal lines, it is made possible to output the digital communication signal S through the other of the digital signal lines. Hence, the abnormality monitoring function and torque detection function can be continued.

Therefore, in the above-mentioned third embodiment, when an abnormality occurs in the digital signal line and the digital communication signal S is not normally output to the ECU 15, the torque sensor function stops, whereas in the present embodiment, continuity of functions can be secured.

Fifth Embodiment

Next, a fifth embodiment will be described.

In the fifth embodiment, two torque sensor circuits are further provided in the above-described first embodiment.

That is, the torque detection apparatus according to the fifth embodiment is configured as illustrated in FIG. 10. In this way, the torque sensor circuits are configured with a first system torque sensor circuit 1 and a second system torque sensor circuit 2. Respectively corresponding torque sensor units (a torque sensor unit 1 and a torque sensor unit 2) are provided. Further, from the torque sensor circuit 1, an analog signal line is used to output the analog main torque signal Tma (torque main 1) and the analog sub torque signal Tsa (torque sub 1) and a digital signal line is used to output the digital communication signal S (communication 1).

Further, from the torque sensor circuit 2, an analog signal line is used to output the analog main torque signal Tma (torque main 2) and the analog sub torque signal Tsa (torque sub 2), and in addition, a digital signal line is used to output the digital communication signal S (communication 2).

With the above configuration, even if an abnormality occurs at one of the torque sensor units, the torque sensor function can be continued as long as the other of the torque sensor units functions normally.

In this way, by providing two torque sensor circuits, it is necessary to increase the signal lines between the torque detection apparatus 30 and the ECU 15 to 10, but the torque sensor function can be continued with higher reliability.

It is to be noted that, in the above fifth embodiment, the description has been given of the case where two torque sensor circuits are further provided in the first embodiment, but two torque sensor circuits may further be provided in the second to fourth embodiments.

Figure 11:
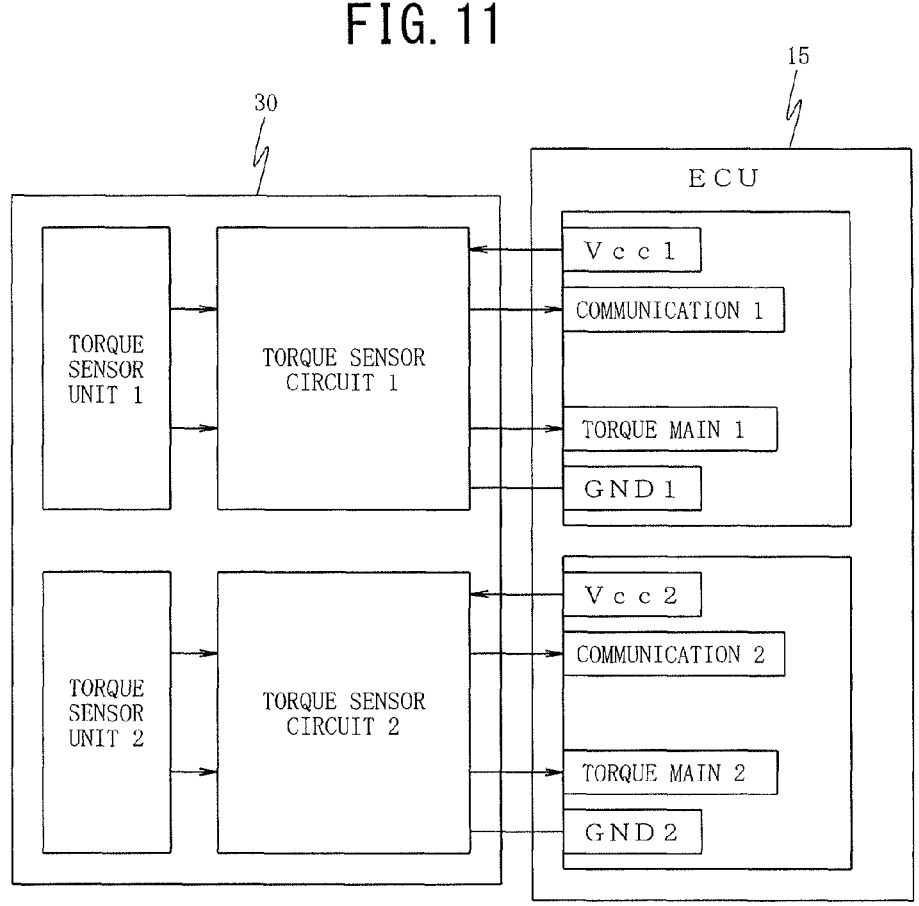
FIG. 11 is a block diagram illustrative of another example of a torque detection apparatus according to the fifth embodiment (two sensors and two systems)
Figure 12:
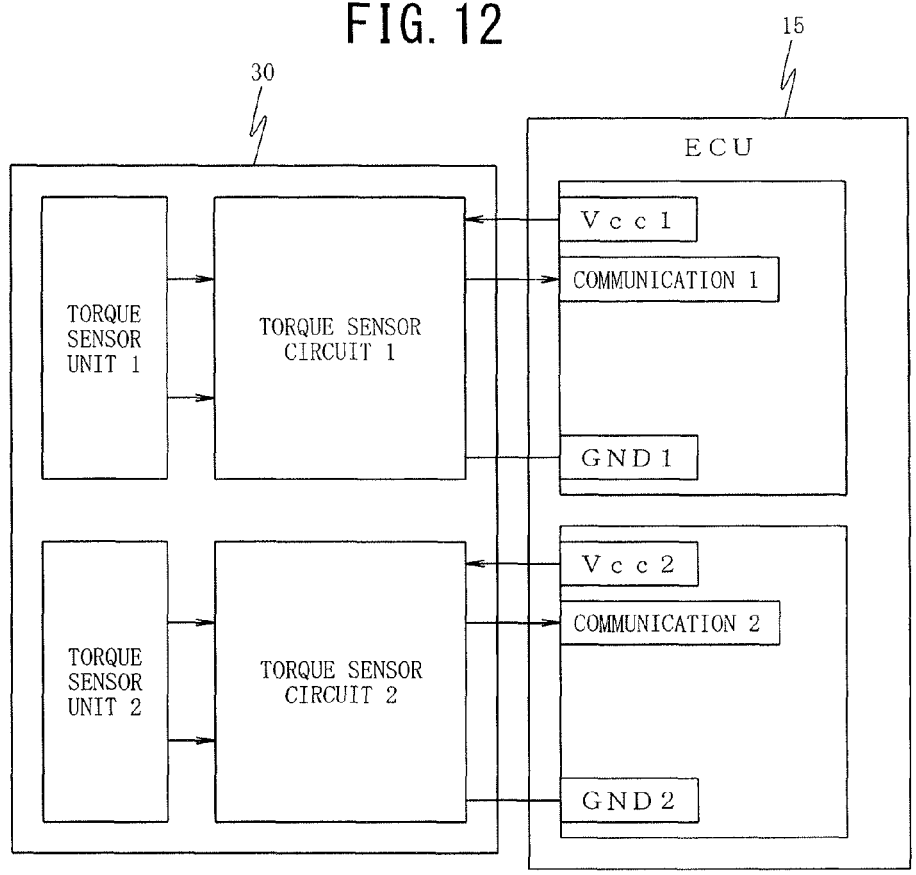
FIG. 12 is a block diagram illustrative of another example of a torque detection apparatus according to the fifth embodiment (two sensors and two systems)
Figure 13:
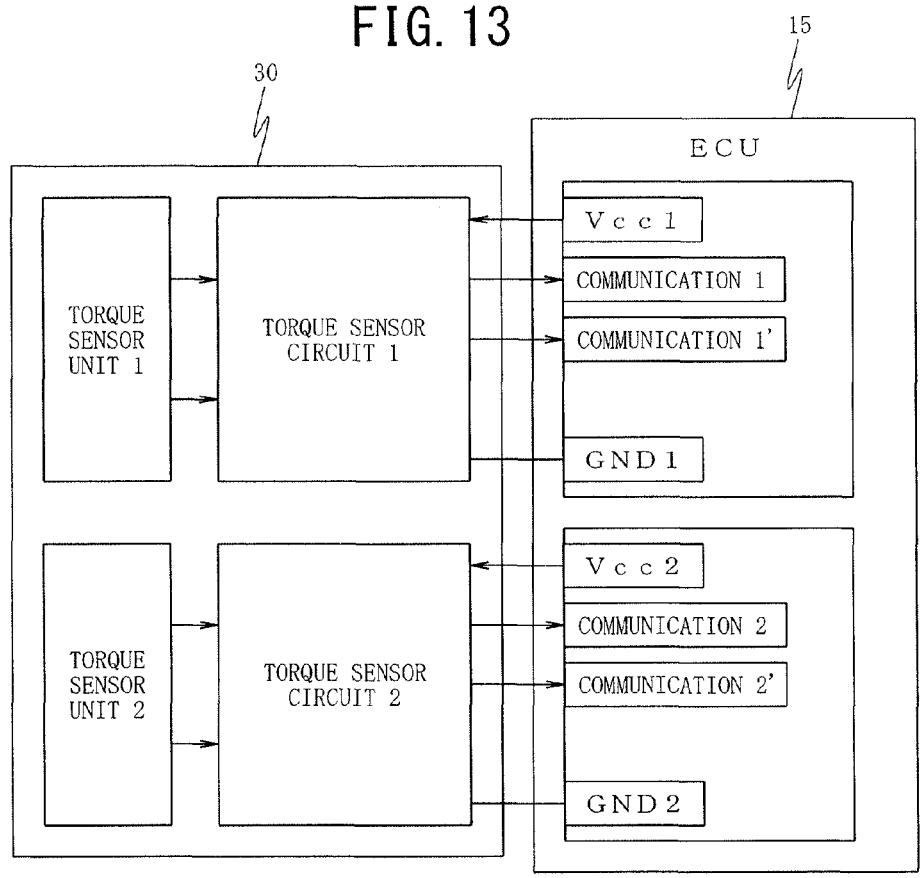
FIG. 13 is a block diagram illustrative of another example of a torque detection apparatus according to the fifth embodiment (two sensors and two systems)

For example, when the two torque sensor circuits illustrated in FIG. 6 and FIG. 7 are further provided as illustrated in FIG. 11, the signal lines between the torque detection apparatuses 30 and the ECUs 15 become eight lines. Further, when the two torque sensor circuits illustrated in FIG. 8 are further provided as illustrated in FIG. 12, the signal lines between the torque detection apparatus 30 and the ECU 15 become six lines. Furthermore, the two torque sensor circuits illustrated in FIG. 9 are further provided as illustrated in FIG. 13, the signal lines between the torque detection apparatus 30 and the ECU 15 become eight lines.

In each case, the torque sensor function can be continued with high reliability.

Furthermore, in the fifth embodiment, the description has been given of the case where the torque sensor units corresponding to the two torque sensor circuits (two sensors and two detection circuits) are provided, but it is also possible to provide a single torque sensor unit for the two torque sensor circuits (one sensor and two detection circuits).

Figure 14:
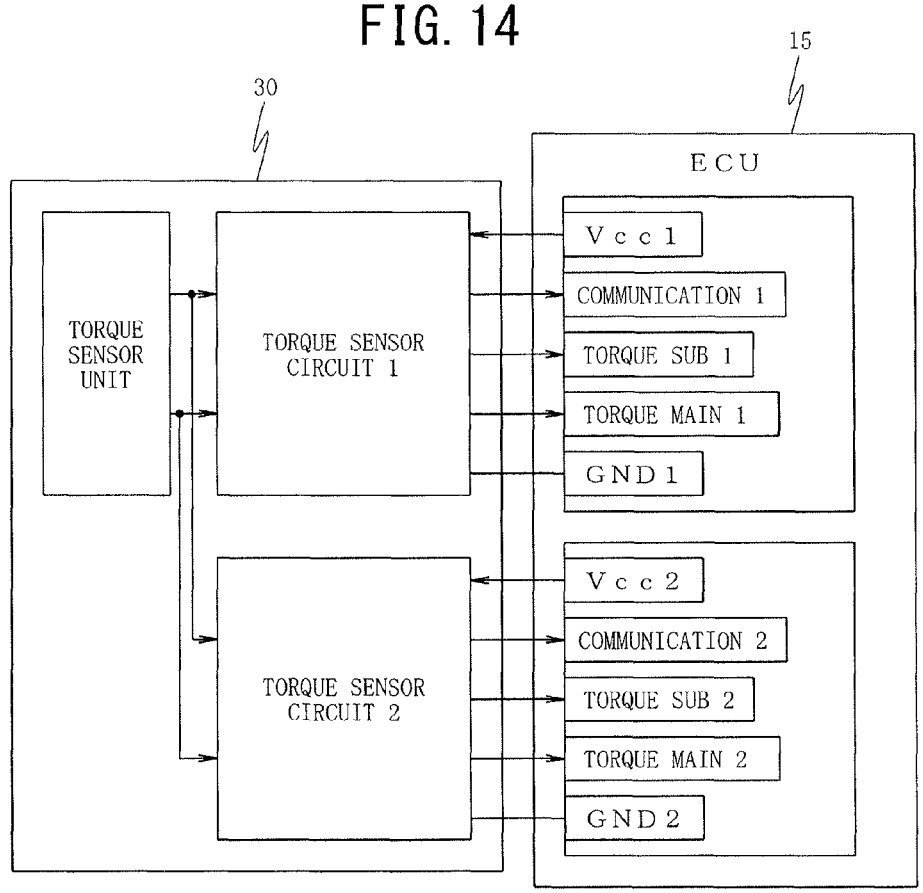
FIG. 14 is a block diagram illustrative of another example of a torque detection apparatus according to the fifth embodiment (one sensor and two systems)
Figure 15:
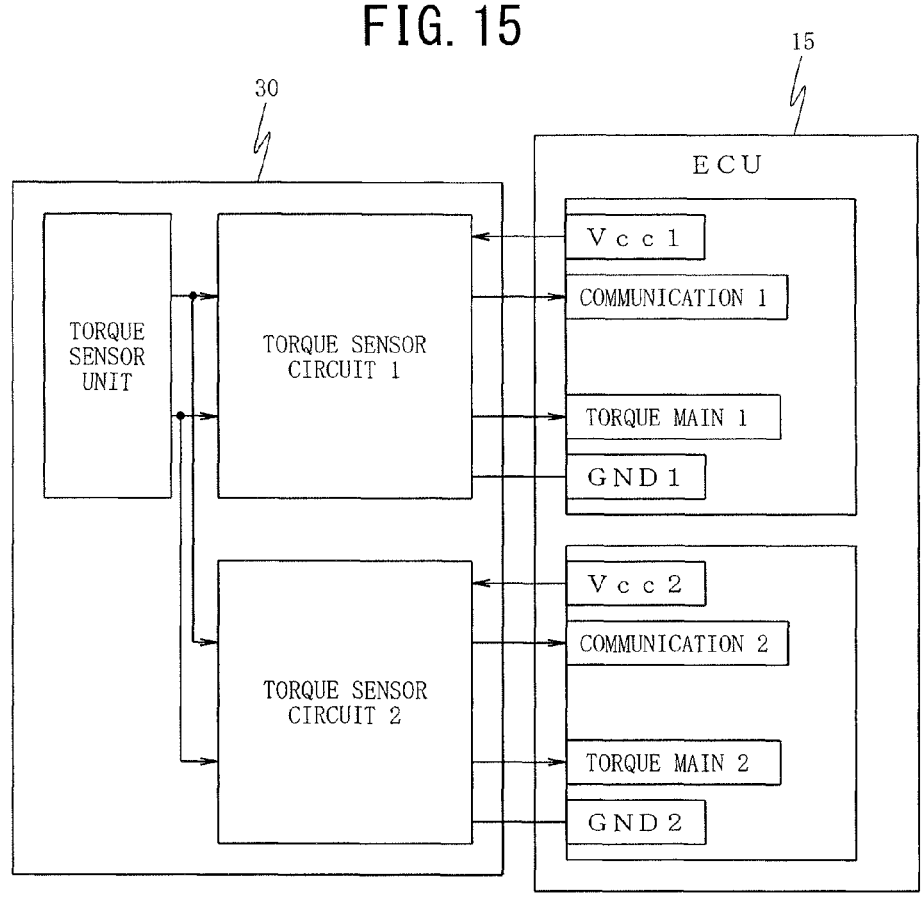
FIG. 15 is a block diagram illustrative of another example of a torque detection apparatus according to the fifth embodiment (one sensor and two systems)
Figure 16:
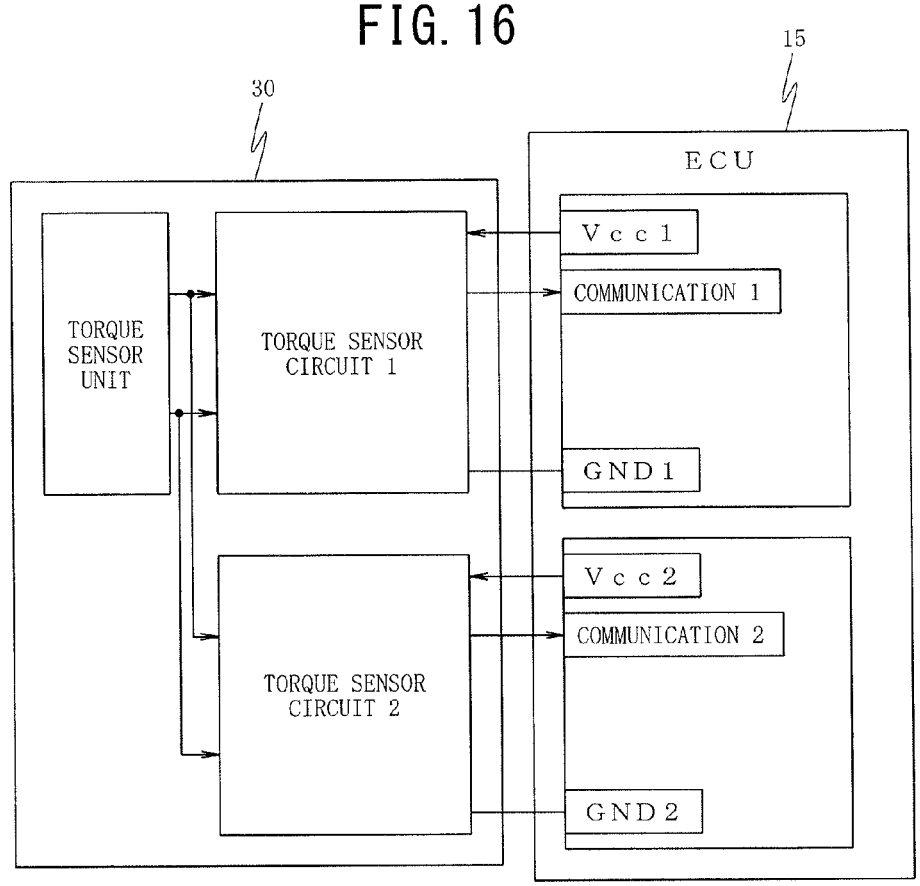
FIG. 16 is a block diagram illustrative of another example of a torque detection apparatus according to the fifth embodiment (one sensor and two systems)
Figure 17:
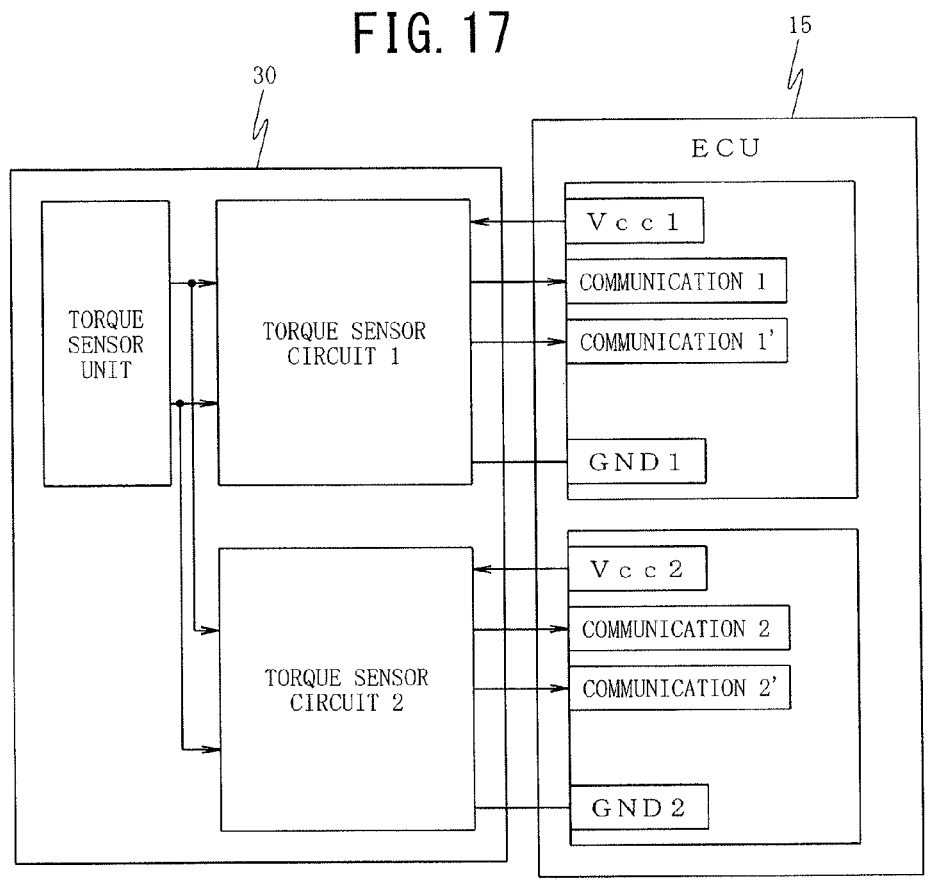
FIG. 17 is a block diagram illustrative of another example of a torque detection apparatus according to the fifth embodiment (one sensor and two systems)

For example, when providing two torque sensor circuits which are illustrated in FIG. 5 (one sensor), the result becomes as illustrated in FIG. 14. Further, if providing two torque sensor circuits which are illustrated in FIG. 6 and FIG. 7 (one sensor), the result becomes as illustrated in FIG. 15, if providing two torque sensor circuits which are illustrated in FIG. 8 (one sensor), the result becomes as illustrated in FIG. 16, and if providing two torque sensor circuits which are illustrated in FIG. 9 (one sensor), the result becomes as illustrated in FIG. 17.

In this case, even if an abnormality occurs in one torque sensor circuit, so long as the other torque sensor circuit normally functions, the torque sensor function can be continued. Therefore, also in this case, continuation of the torque sensor function with high reliability becomes possible.

Sixth Embodiment

Next, a sixth embodiment will be described.

This sixth embodiment provides the above-mentioned first embodiment which is provided with a function of correcting error in the torque signals (analog main torque signal Tma and analog sub torque signal Tsa).

Figure 18:
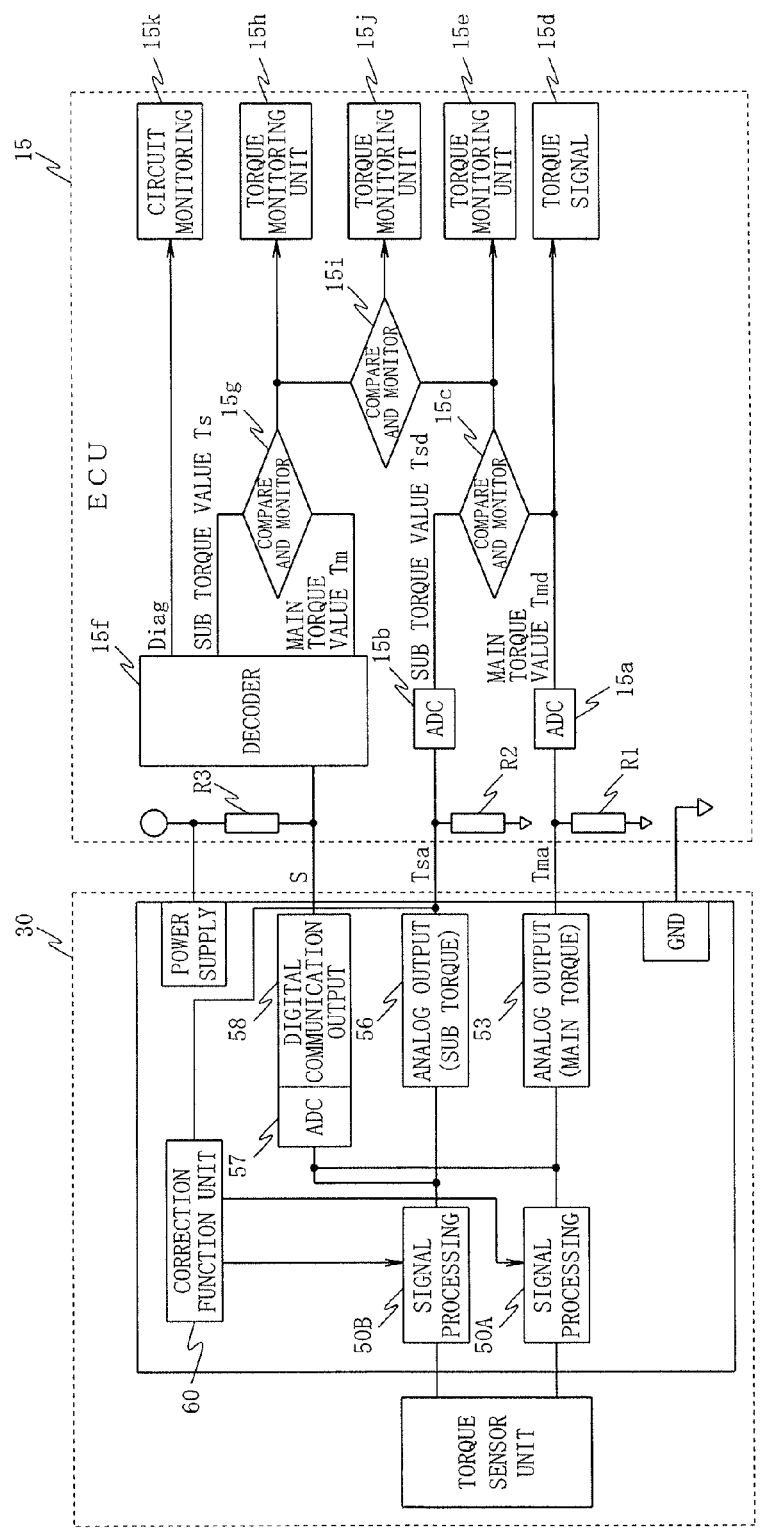
FIG. 18 is a block diagram illustrative of a torque detection apparatus according to a sixth embodiment.

That is, the torque detection apparatus 30 of the sixth embodiment, as illustrated in FIG. 18, is configured adding a correction function unit 60 to the torque detection apparatus 30 which is illustrated in FIG. 5.

The correction function unit 60 has the function of receiving as input and writing correction data for correcting error of a torque signal from an external control circuit and the function of changing the processing circuit constants of the signal processing units 50A and 50B based on the written correction data so as to correct error of the torque signal.

Here, what are corrected by the correction function unit 60 are offset of the torque signal from the zero point and the gain (slant) of the torque signal. That is, the correction data includes an offset correction value and slant correction value.

Figure 19:
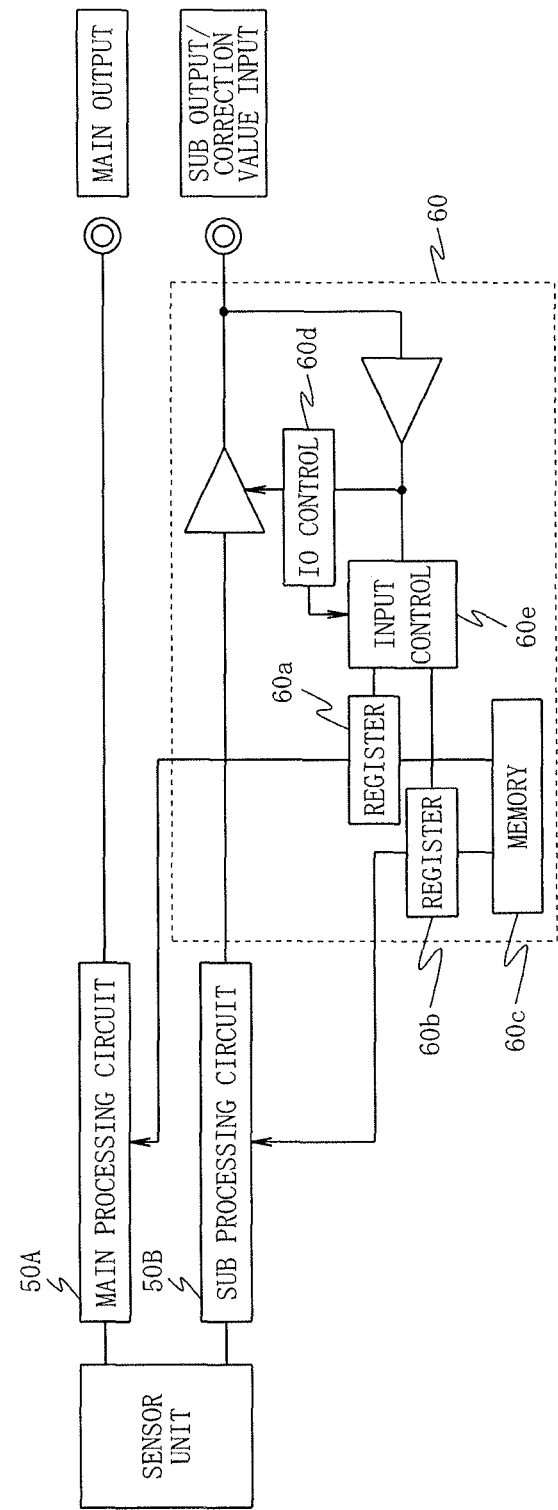
FIG. 19 is a block diagram illustrative of a specific configuration of a correction function unit.

FIG. 19 is a block diagram illustrative of a specific configuration of the correction function unit 60.

As illustrated in FIG. 19, the correction function unit 60 is provided with registers 60a and 60b as temporary storage units able to be written with correction data and a memory 60c as a constant storage unit for storing data of the registers 60a and 60b. The correction data for the main signal is written into the register 60a, while the correction data for the sub signal is written into the register 60b.

Further, the output signal line for outputting the analog sub torque signal Tsa from the torque detection apparatus 30 to the ECU 15 (sub signal output terminal) and the input signal line for inputting the correction data from the external control circuit (not illustrated) to the correction function unit 60 in the torque detection apparatus 30 (data write terminal) are jointly used. These are switched by an external control circuit.

When writing the correction data into the correction function unit 60, a predetermined pulse train is input from an external control circuit to the torque detection apparatus 30 from dual terminals of the sub signal output terminal and data write terminal. Then, an IO control unit 60d receives this and stops the output buffer at the sub signal side. Accordingly, the sub signal output terminal is switched to the data write terminal and the correction data can be written. Then, the correction data input from the external control circuit is written through the input control unit 60e into the registers 60a and 60b. Further, the correction data written into the registers 60a and 60b are stored in the memory 60c.

It is to be noted that, the registers 60a and 60b correspond to the data storage unit for correction, and the IO control unit 60d corresponds to the input/output switching unit.

The correction data written into the registers 60a and 60b are used for correcting an error of the torque signal. An offset amount correction value and a slant amount correction value are correction values for making the digital torque waveform obtained by converting a detected analog torque signal from an analog to a digital format to correspond to the desired torque waveform. As a correcting method, for example, the analog torque signals (analog main torque signal Tma and analog sub torque signal Tsa) are converted to a digital format and the digital torque value after AD conversion is corrected with the offset amount correction value and slant amount correction value. Specifically, the (AD amount value before correction)×(slant amount correction value)+(offset amount correction value) is made to be a corrected digital torque value.

It is to be noted that, here, the description has been given for the case of using digital processing for correction, but a known means in the signal processing circuit may also be used for analog processing. For example, an input resistance of the operational amplifier and a feedback resistance may be configured with ladder resistances and the ladder resistance value may be selected in accordance with the correction values written into the registers 60a and 60b.

Further, the next time power is turned on, the correction data stored in the memory 60c is transferred to the registers 60a and 60b and the above-mentioned correction processing is performed. Further, the correction function unit 60 has an initial diagnosis function. The memory 60c is designed to also store inverted data obtained by inverting the written data. Immediately after the power is turned on, the two data are completely different is confirmed in the initial diagnosis, and then the above-mentioned correction processing is started.

As described heretofore, it is possible to correct an error in the torque sensor signal and realize a torque sensor system with high accuracy.

Additionally, by jointly using an analog sub torque signal line and a correction data write line, it is possible to suppress the increase in the signal lines for connecting the torque detection apparatus 30. Furthermore, by adding the correction write function at the sub side for monitoring the main torque signal, it is possible to reduce the signal loss risk on the main side and ensure the security of functions on the main side.

Supposing that a main side torque signal line and a memory write signal line are doubled, a risk arises of the torque signal line ending up switching to the memory write function at the time of constant operation. For example, if a noise is superimposed onto the torque signal line, a torque signal is liable to end up suddenly being stuck at "High" or "Low". In the present embodiment, it is possible to suppress the risk of loss of the torque signal used as the main, thereby making it possible to realize a stable torque detection function.

Further, even when a sub signal line ends up shifting to the write mode due to noise etc., comparison with the main signal enables the ECU 15 side to detect an abnormality.

It is to be noted that, in the above sixth embodiment, a write function of the correction data can also be provided in the ECU 15. In this case, since correction in the final process of assembly of the EPS becomes possible, not only the torque sensor but also the correction including error when assembling the EPS becomes possible.

Further, in the above sixth embodiment, as described in the above-mentioned fifth embodiment, application to a system which has two torque sensor circuits is possible. In this case, it is applicable not only to a system which has a single sensor unit and two torque sensor circuits but also to a system which has two sensor units and two torque sensor circuits.

Seventh Embodiment

Next, a seventh embodiment will be described.

In the seventh embodiment, a function for correcting an error of the torque signal is provided in the above-mentioned second embodiment.

Figure 20:
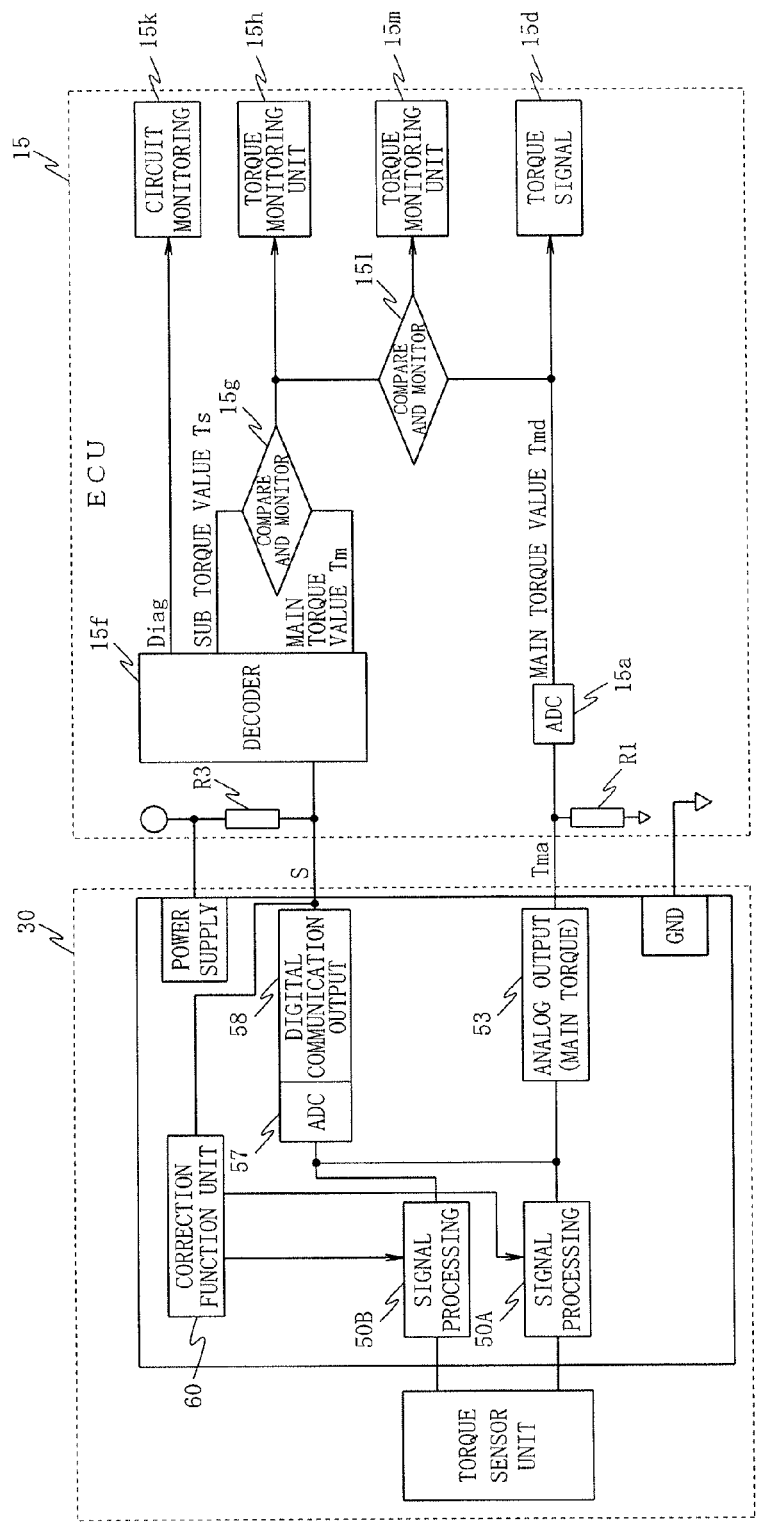
FIG. 20 is a block diagram illustrative of a torque detection apparatus according to a seventh embodiment.

That is, the torque detection apparatus 30 according to the seventh embodiment, as illustrated in FIG. 20, is configured adding a correction function unit 60 to the torque detection apparatus 30 which is illustrated in FIG. 6.

Here, the correction function unit 60 jointly uses an output signal line for outputting a digital communication signal S from the torque detection apparatus 30 to the ECU 15 (communication output terminal) and an input signal line for inputting correction data to a correction function unit 60 in the torque detection apparatus 30 from an external control circuit (not illustrated) (data write terminal). These are switched by the external control circuit.

That is, in the above-mentioned sixth embodiment, as the sub signal line which is used together with the correction data write line, an analog sub torque signal line is used, while in the present embodiment, a digital communication signal line is used as the sub signal line which is used together with the correction data write line. Further, the rest of the configuration is similar to the correction function unit 60 in the above-mentioned sixth embodiment.

Also, in this case, it is possible to suppress the risk of signal loss at the main side while correcting error of the torque sensor signals and realizing a stable torque detection function.

It is to be noted that, here, the description has been given with reference to the case when adding the correction function unit 60 to the torque detection apparatus 30 which is illustrated in FIG. 6, but it is also possible to add a correction function unit 60 to the torque detection apparatus 30 which is illustrated in FIG. 7 and jointly use the output signal line of the digital communication signal S and the write signal line of the correction data.

Figure 21:
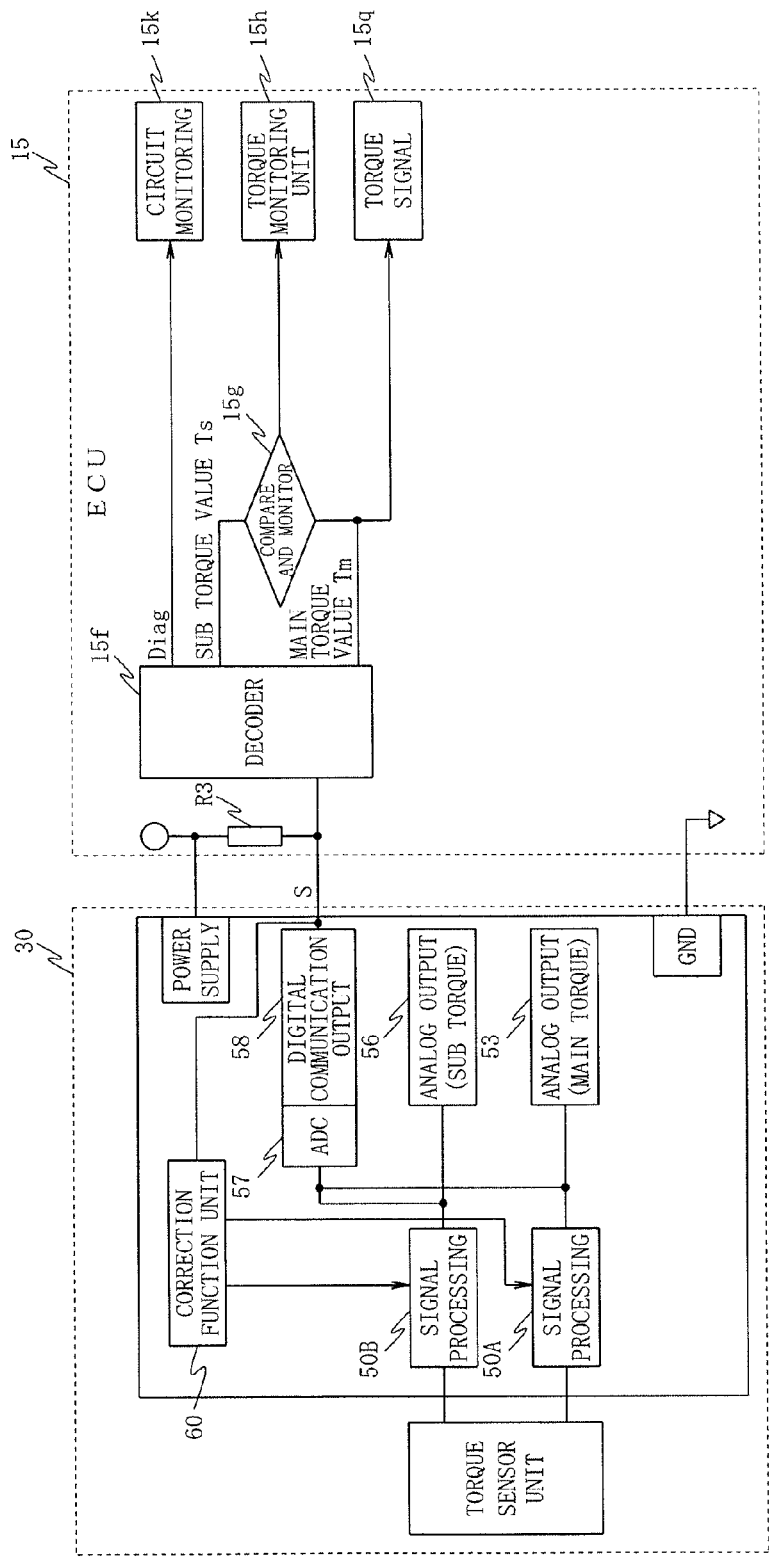
FIG. 21 is a block diagram illustrative of another example of a torque detection apparatus according to the seventh embodiment.

Furthermore, as illustrated in FIG. 21, it is possible to add a correction function unit 60 to the torque detection apparatus 30 in the third embodiment which is illustrated in FIG. 8 and jointly use the output signal line of the digital communication signal S and the write signal line of the correction data.

Further, the seventh embodiment can, like in the above-mentioned fifth embodiment, be applied even to a system which has two torque sensor circuits. In this case, it can be applied to both a system which has a single sensor unit and two torque sensor circuits and a system which has two sensor units and two torque sensor circuits.

Eighth Embodiment

Next, an eighth embodiment will be described.

In the eighth embodiment, in addition to the above-mentioned first to seventh embodiments, a function of detecting an abnormality of the communication output unit 58 which outputs the digital communication signal S is further provided.

Hereinafter, the configuration of the data output part of the communication output unit 58 will be specifically described.

Figure 22:
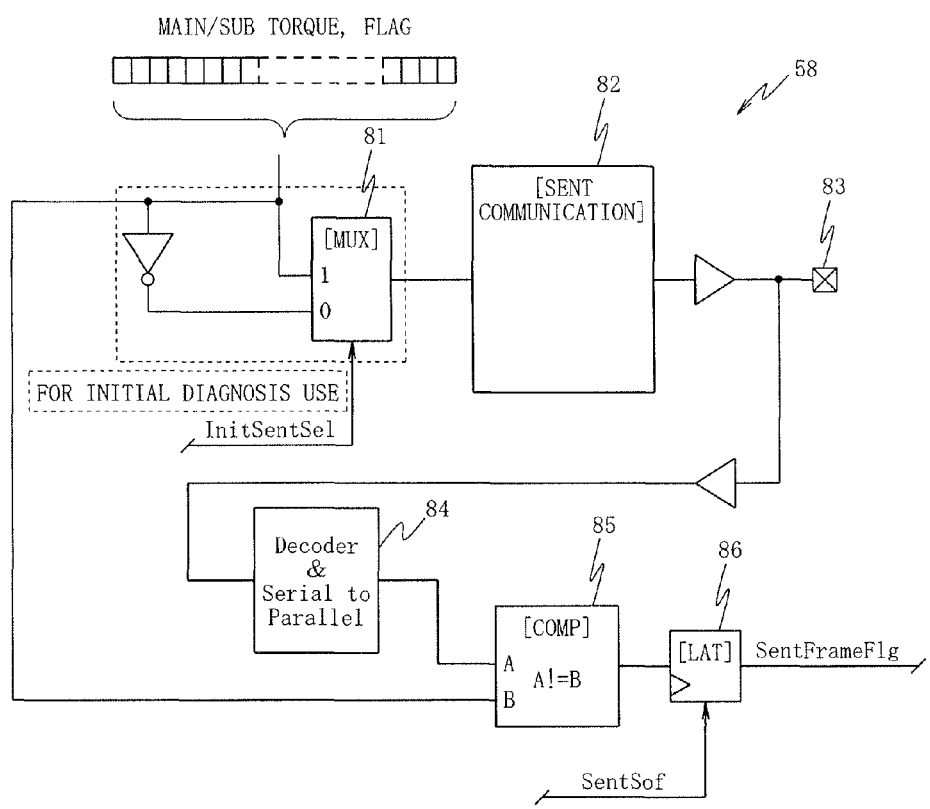
FIG. 22 is a block diagram illustrative of the configuration of a data output part of a communication output unit according to an eighth embodiment.

FIG. 22 is a block diagram illustrative of the configuration of a data output part of the communication output unit 58.

The communication output unit 58 is provided with a multiplexer (MUX) 81. The MUX 81 receives as input a selection signal of "1" (InitSentSel) at a normal time, and a diagnosis signal generated in the communication output unit 58 (below, called the "diagnosis signal S0") is input as is to a communication output signal generation unit 82. The communication output signal generation unit 82 outputs the input diagnosis signal S0 as data for communication in the unit of one frame (diagnosis signal S). The data for communication is output from the output terminal (diagnosis signal output terminal) 83 to the ECU 15 and input to a data conversion unit 84.

The data conversion unit 84 has a function as a decoder which decodes the input the data for communication and a function of converting serial data to parallel data. This data conversion unit 84 performs processing to return the data for communication after conversion by the communication output signal generation unit 82 to the same data format as that of the diagnosis signal S0 before conversion. The output of the data conversion unit 84 is input to a comparator 85.

The comparator 85 receives not only the output of the data conversion unit 84 but also an original diagnosis signal S0. Further, the comparator 85 compares them. The result is latched at a latch circuit 86. From the comparator 85, a signal of "0" is output when the both are same, whereas the signal of "1" is output when the both are different. The signal latched by the latch circuit 86 is output as an abnormality detection flag (SentFrameFlg) at a predetermined timing.

Furthermore, a diagnosis output unit 58A is provided with an initial diagnosis function of checking in advance if the comparator 85 itself is normally functioning. Here, the signal output from the data conversion unit 84 is made a different signal from the diagnosis signal S0. They are input to the comparator 85. Then, by confirming that the two signals are different after the comparison (abnormality diagnosis), it is determined that the comparator 85 is normally functioning.

Specifically, at the time of initial diagnosis, an MUX 81 receives a selection signal of "0" (InitSentSel), and an inverted signal of the diagnosis signal S0 is input to the communication output signal generation unit 82. In this case, the output signal of the data conversion unit 84 and the original diagnosis signal S0 are different. Therefore, if the comparator 85 is normal, an abnormality detection flag of "1" (SentFrameFlg) is output. By confirming this, it is confirmed that the comparator 85 is operating normally. This initial diagnosis is performed, for example, immediately after the power is turned on (or immediately after the ignition switch 18 is turned on) and before the controller 15 starts the steering assistance control.

It is to be noted that, here, the description has been given of the case of inputting the inverted signal of the diagnosis signal S0 to the communication output signal generation unit 82 and returning its output signal in a data format that is the same as that of the diagnosis signal S0 at the data conversion unit 84, at the time of initial diagnosis, as a signal for diagnosis, but any signals are input to the comparator 85 as far as they are different from each other. The signal for diagnosis is not limited to this.

It is to be noted that, the communication output unit 58 corresponds to the abnormality diagnosis unit, the diagnosis signal generating unit, the diagnosis signal output unit, the output abnormality detection unit, the diagnosis result output unit, and the initial diagnosis unit. Here, the MUX 81 corresponds to the initial diagnosis unit, the communication output signal generation unit 82 corresponds to the diagnosis signal output unit, the data conversion unit 84 and the comparator 85 corresponds to the output abnormality detection unit, and the latch circuit 86 corresponds to the diagnosis result output unit.

With the above configuration, immediately after the power is turned on and before the ECU 15 starts the steering assistance control, the communication output unit 58 inputs a selection signal (InitSentSel) of "0" to the MUX 81, and performs the initial diagnosis of the comparator 85 itself. During this initial diagnosis, a signal indicating that the initial diagnosis is underway is output from the communication output unit 58, so the ECU 15 recognizes that the communication output signal generation unit 82 is in the middle of initial diagnosis. That is, the steering assistance control is not performed in this state.

In this way, as the torque detection apparatus 30 outputs information in the initial diagnosis, the ECU 15 is capable of recognizing from the information that the torque sensor system is not yet normally operating and the main torque signal Tma cannot be used.

When each function is operating normal as the result of the initial diagnosis, the torque output function of the torque detection apparatus 30 operates. Then, the signal processing circuits 50A and 50B calculate the analog main torque signal Tma and the analog sub torque signal Tsa corresponding to the output signals of the coil pair 22, and the main output unit 53 and the sub output unit 56 output them to the ECU 15. Accordingly, it is possible to suitably perform the steering assistance control.

During the above steering assistance control, the communication output unit 58 diagnoses an abnormality of the signal processing circuits 50A and 50B. Further, the communication output unit 58 outputs the abnormality diagnosis result to the ECU 15. When the ECU 15 confirms that the signal processing circuits 50A and 50B are operating normally from the diagnosis information S received from the communication output unit 58, the steering assistance control is continued, whereas the ECU 15 confirms that an abnormality has occurred, a fail-safe mode for stopping steering assistance control is shifted to.

In this regard, in general, in the data communication, the communication signal includes an CRC etc. and the reliability of the communication is monitored. However, when whether or not an abnormality has occurred at the communication data generation unit is not monitored, the ECU on the later stage cannot determine if the communication data itself is correct.

In contrast, according to the present embodiment, a diagnosis signal S0 before input into the communication output signal generation unit 82 is compared with a signal when returning the data for communication after conversion by the communication output signal generation unit 82 to have the same data format as that of the diagnosis signal S0 before conversion, and if a difference has occurred between them is monitored. Further, when a difference occurs between them, it is determined that an abnormality has occurred in the communication output signal generation unit 82 and the information is sent to the ECU 15. Therefore, the ECU 15 is capable of determining if the diagnosis signal S itself is correct.

In this way, it is possible to improve the reliability of the data for communication which is generated. For this reason, the ECU 15 is capable of suitably recognizing if an abnormality occurs in the torque detection apparatus 30.

Further, since an initial diagnosis function is provided to confirm if the comparator 85 for monitoring the communication output signal generation unit 82 for an abnormality is operating normally, a high-reliability communication data output function can be achieved.

It is to be noted that, in the above sixth embodiment, the torque detection apparatus 30 may also be configured with a custom IC. In this case, the diagnosis signal S is output from a diagnosis signal output terminal of the custom IC to the ECU 15 on the later stage. At this time, by providing a feedback terminal which returns the data for communication output from the diagnosis signal output terminal to the inside of a custom IC, and then comparing the data for communication before output from the diagnosis signal output terminal and the data for communication which returns it from the feedback terminal to the custom IC, it is made possible to detect line disconnection, a supply fault, a ground fault, or another abnormality which occurs at the output terminal system of a custom IC (terminal abnormality detection unit). Preferably, the abnormality diagnosis information of the diagnosis signal output terminal is output to the ECU 15.

Ninth Embodiment

Next, a ninth embodiment will be described.

In the ninth embodiment, a function of detecting abnormalities of the excitation signals is further provided in the above-mentioned first to eighth embodiments.

Hereinafter, the configuration of the oscillation unit 65 will be specifically described.

Figure 23:
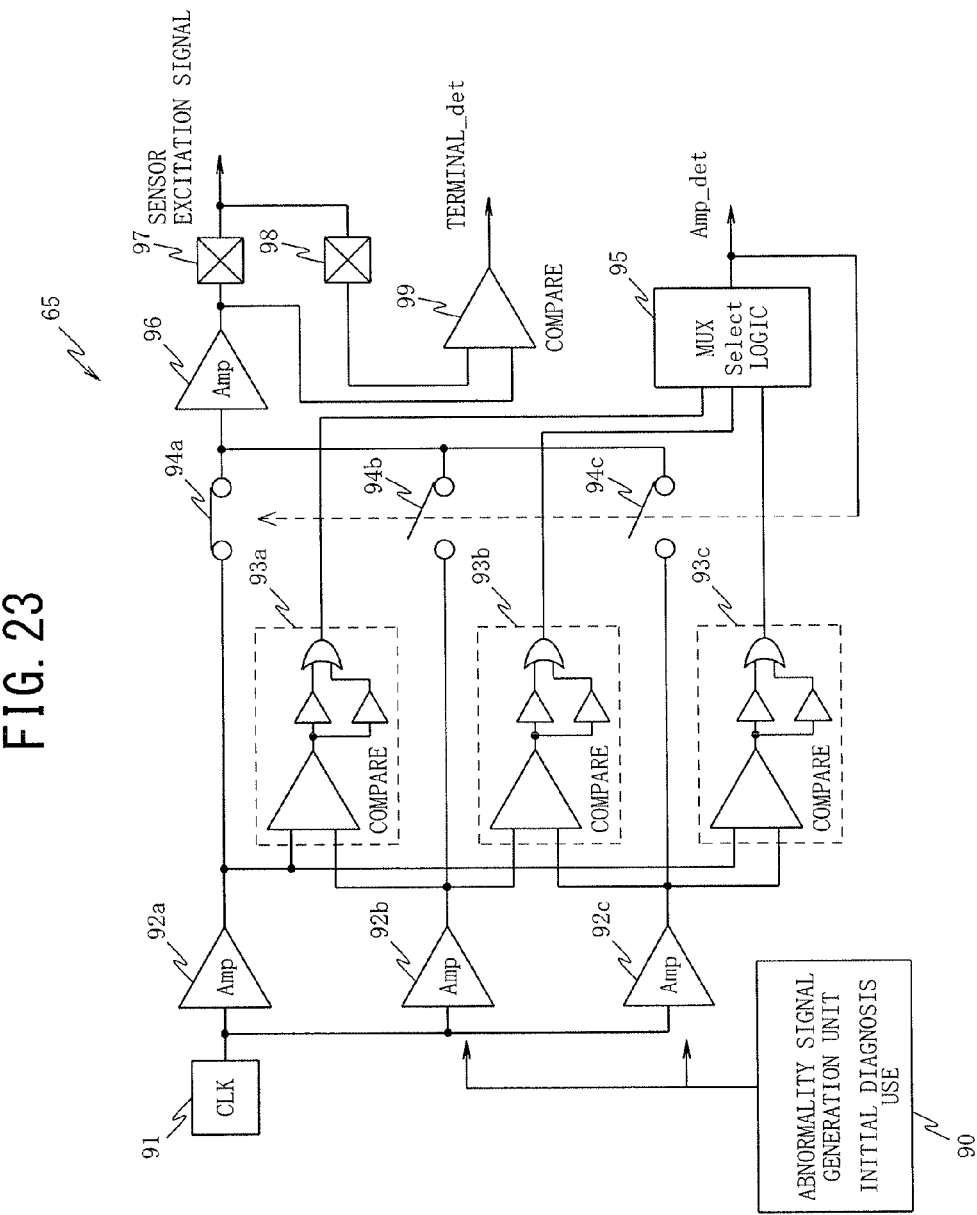
FIG. 23 is a block diagram illustrative of the specific configuration of an oscillation unit according to a ninth embodiment.

FIG. 23 is a block diagram illustrative of a specific configuration of an oscillation unit 65.

The oscillation unit 65 is supposed to be configured with a custom IC for reducing costs. This oscillation unit 65 is provided with a clock signal generation unit 91 which generates and outputs a clock signal. The clock signal output from the clock signal generation unit 91 is input to three identical configuration excitation amplifiers 92a to 92c. The excitation signals are output from the excitation amplifiers 92a to 92c (sine waves for excitation). In this way, the oscillation unit 65 generates three excitation signals in the same technique.

The three excitation signals are compared two by two by comparing circuits 93a to 93c. That is, the comparing circuit 93a compares the excitation signal output from the excitation amplifier 92a with the excitation signal output from the excitation amplifier 92b. Further, the comparing circuit 93b compares the excitation signal output from the excitation amplifier 92b with the excitation signal output from the excitation amplifier 92c. Furthermore, the comparing circuit 93c compares the excitation signal output from the excitation amplifier 92a with the excitation signal output from the excitation amplifier 92c. The results of comparison of the comparing circuits 93a to 93c are input to an excitation signal selection circuit 95, as will be described later.

In addition, the signal line which outputs an excitation signal from the excitation amplifier 92a is provided with a switch 94a, the signal line which outputs an excitation signal from the excitation amplifier 92b is provided with a switch 94b, and the signal line which outputs an excitation signal from the excitation amplifier 92c is provided with a switch 94c. On and off of the switches 94a to 94c are controlled by the excitation signal selection circuit 95.

The excitation signal selection circuit 95 identifies the excitation signal at which the abnormality occurs among the three excitation signals, based upon the results of comparison of the excitation amplifiers 92a to 92c. In this situation, the excitation signal selection circuit 95 identifies the excitation signal which does not match with the two excitation signals among the three excitation signals to recognize as the excitation signal at which the abnormality occurs. Further, the excitation signal selection circuit 95 outputs this information (Amp_det) as an excitation diagnosis signal to the ECU 15.

Further, the excitation signal selection circuit 95 selects one of the normal excitation signals and controls the switches 94a to 94c to turn on only a switch provided at a signal line which outputs a normal excitation signal. For example, when selecting the excitation signal output from the excitation amplifier 92a, as illustrated in FIG. 23, only the switch 94a is turned on.

The excitation signal selected by the excitation signal selection circuit 95 is applied through an amplifier 96 as a sensor excitation signal from an excitation signal terminal 97 to the bridge circuit illustrated in FIG. 2.

Moreover, the sensor excitation signal output from the excitation signal terminal 97 is returned from a feedback terminal 98 into the custom IC. A comparator 99 is used for comparing with the sensor excitation signal output from the amplifier 96, that is, the sensor excitation signal before being output from the excitation signal terminal 97. Then, the result of comparison of the comparator 99 (terminal_det) is output as an excitation diagnosis signal to the ECU 15.

Furthermore, the oscillation unit 65 has an initial diagnosis function for diagnosing whether or not the comparing circuits 93a to 93c which detect abnormalities of the excitation signal are functioning normally. The initial diagnosis is started immediately after the power is turned on (or immediately after the ignition switch 18 is turned on) and before the ECU 15 side starts the steering assistance control. Further, during the initial diagnosis, an initial diagnosis flag is set up etc. so as to prevent the ECU 15 from using the torque sensor signal (preventing the steering assistance control).

In this initial diagnosis, an abnormality signal generation unit 90 inputs to the excitation amplifiers 92b and 92c an abnormality signal instead of the clock signal from the clock signal generation unit 91 to generate a state where the output signals from the three excitation amplifiers 92a to 92c do not match. In this situation, the above abnormality signal means a signal where the result of comparison by the normally functioning comparing circuit becomes "not matching" (diagnosed as an abnormality).

Then, when the abnormality signal generation unit 90 inputs an abnormality signal to the excitation amplifiers 92b and 92c, and in addition, when the comparing circuits 93a to 93c diagnose abnormality of the excitation signal, the excitation signal selection circuit 95 determines that the comparing circuits 93a to 93c are normally functioning.

When receiving an excitation diagnosis signal from the oscillation unit 65, the ECU 15 confirms the abnormality diagnosis information (Amp_det) of the excitation amplifiers 92a to 92c included in the excitation diagnosis signal and the abnormality diagnosis information (terminal_det) of the excitation signal terminal 97. Then, when determining from Amp_det that there is no normal excitation amplifier 92a to 92c or determining that the excitation signal terminal 97 is abnormal, the steering assistance control is not carried out.

It is to be noted that, the clock signal generation unit 91 and the excitation amplifiers 92a to 92c correspond to the excitation signal generation unit, the comparing circuits 93a to 93c correspond to the abnormality detection unit, and the switches 94a to 94c and excitation signal selection circuit 95 correspond to the excitation signal selection unit. Furthermore, the comparator 99 corresponds to the excitation signal terminal abnormality detection unit, and the abnormality signal generation unit 90 corresponds to the excitation signal initial diagnosis unit.

With the above configuration, immediately after the power is turned on and before the ECU 15 starts the steering assistance control, the oscillation unit 65 outputs an abnormality signal from the abnormality signal generation unit 90 and performs an initial diagnosis of the comparing circuits 93a to 93c themselves. During this initial diagnosis, a signal which shows that the initial diagnosis is underway is output from the oscillation unit 65, so that the ECU 15 recognizes that the initial diagnosis of the oscillation unit 65 is underway. That is, the steering assistance control is not performed in this state.

In this way, the torque detection apparatus 30 outputs information in the initial diagnosis, so that the ECU 15 can recognize that the torque sensor system is not yet operating normally and the use of the main torque signal Tma is impossible from the information.

When each of the functions being normal is diagnosed as a result of the initial diagnosis, the torque output function of the torque detection apparatus 30 operates. At this time, when all of the three excitation amplifiers 92a to 92c of the oscillation unit 65 are normal, all of the three excitation signals output from the three excitation amplifiers 92a to 92c match one another. For this reason, the excitation signal selection circuit 95 recognizes that the excitation amplifiers 92a to 92c are normal based on the results of comparison of the comparing circuits 93a to 93c.

Therefore, the excitation signal selection circuit 95, for example, as illustrated in FIG. 23, turns on only the switch 94a and uses the normal excitation amplifier 92a to generate a sensor excitation signal. Further, this is applied to the bridge circuit. Accordingly, it is possible to suitably perform the steering assistance control.

From this state, if an abnormality occurs at only the excitation amplifier 92a, the excitation signal output from the excitation amplifier 92a and the excitation signal output from the excitation amplifiers 92b and 92c do not match each other. For this reason, the excitation signal selection circuit 95 detects that an abnormality has occurred at the excitation amplifier 92a based on the results of comparison of the comparing circuits 93a to 93c. Therefore, the excitation signal selection circuit 95, for example, turns on only the switch 94b and uses the normal excitation amplifier 92b to generate a sensor excitation signal. In this way, the excitation function is continued. Therefore, the steering assistance control can be continued suitably.

In this way, three functions which generate sine waves for excitation from a single clock signal by the same method (excitation amplifiers) are provided and arranged in the custom IC. Further, all combinations of two signals selected from the three signals output from the three excitation amplifiers 92a to 92c are monitored for a difference in the two signal in the comparing process.

By this comparing process, it is possible to detect not only the abnormalities of line disconnection, but also frequency abnormality, duty abnormality, and any abnormality relating to distortion or deformation of triangular waves, pulse waves, saturation waves, or other excitation signal waveforms.

In addition, if an abnormality occurs at any of the three excitation amplifiers 92a to 92c, it can be suitably recognized that an abnormality has occurred and the excitation amplifier in which the abnormality has occurred can be identified. Therefore, a normal excitation amplifier can be selected and excitation continued and the excitation function with high reliability can be achieved.

Furthermore, the sensor excitation signal output from the excitation signal terminal 97 of the custom IC is returned from the feedback terminal 98 to the custom IC, and is then compared with the excitation signal before output from the excitation signal terminal 97. Therefore, it is possible to detect when the excitation output terminals of the custom IC experience line disconnection, supply fault, ground fault, and any other abnormality.

Further, an excitation diagnosis signal which includes abnormality diagnosis information of the excitation amplifiers 92a to 92c and abnormality diagnosis information of the excitation signal terminal 97 is output to the ECU 15, so that the ECU 15 can determine that an abnormality has occurred at the torque sensor system from the excitation diagnosis signal.

Further, if an abnormality occurs, it will be possible to suitably shift to a fail-safe mode or stop the steering assistance control. For this reason, it is possible to prevent the system from being determined normal regardless of an abnormality occurring at the ECU 15 or from continuing the normal steering assistance control, thereby making it possible to improve the reliability of the electric power steering system.

Moreover, an initial diagnosis function is provided to check if the comparing circuits 93a to 93c which monitor the excitation amplifiers 92a to 92c for abnormalities are operating normally. Therefore, the excitation function with higher reliability can be achieved.

Modifications to the Embodiments

It is to be noted that, in the above embodiments, the description has been given of the case of communication of the digital communication signal S using SENT communication, but other communication means may also be used in accordance with its application and objective. For example, a PWM signal etc. may also be used.

Further, in the above embodiments, the description has been given of the case of using a coil type torque sensor, but a configuration using for example a magneto-response type element which outputs two torque signals may also be sued.

INDUSTRIAL APPLICABILITY

According to the torque detection apparatus according to the present invention, the apparatus outputs a digital communication signal in which a digital torque value and diagnosis information of a torque sensor circuit are superimposed. Therefore, it is possible to suitably send the state of occurrence of abnormalities to the ECU, thereby making it possible to improve the continuity of a torque detection function. For this reason, it is possible to construct a torque sensor system with high reliability, and is useful.

Therefore, in an electric power steering system and vehicle provided with the torque detection apparatus, the steering assistance control is possible in a suitable manner, and this is useful.

REFERENCE SIGNS LIST

1 . . . steering wheel, 2 . . . steering shaft, 10 . . . steering assistance mechanism, 11 . . . speed reduction gear, 12 . . . electric motor, 15 . . . controller, 16 . . . vehicle speed sensor, 17 . . . battery, ignition switch, 20 . . . torque sensor, 22 . . . coil pairs, 22a, 22b . . . coils, 30 . . . torque detection device, 51 . . . main amplification full wave rectifying unit, 52 . . . main smoothing unit, 53 . . . main output unit, 54 . . . sub amplification full wave rectifying unit, 55 . . . sub smoothing unit, 56 . . . sub output unit, 57 . . . ADC, 58 . . . communication output unit, 59 . . . connector, 81 . . . MUX, 82 . . . communication output signal generation unit, 83 . . . communication output terminal, 84 . . . data conversion unit, 85 . . . comparator, 86 . . . latch circuit, 90 . . . abnormality signal generation unit, 91 . . . clock signal generation unit, 92a to 92c excitation amplifier, 93a to 93c . . . comparing circuit, 94a to 94c switch, 95 . . . excitation signal selection circuit, 96 . . . amplifier, 97 . . . excitation signal terminal, 98 . . . feedback terminal, 99 . . . comparator

The invention claimed is:
1. A torque detection apparatus comprising:
a sensor unit which outputs a signal corresponding to a torque generated at a rotary shaft and a torque sensor circuit which detects the torque generated at the rotary shaft based upon the signal output from the sensor unit, the torque sensor circuit comprising:
- a signal processing unit which detects an analog main torque signal and an analog sub torque signal based upon the signal output from the sensor unit;
- an AD converter which converts the analog main torque signal and the analog sub torque signal detected by the signal processing unit to digital values of a main torque value and a sub torque value;
- a monitoring unit which monitors for an abnormality of the signal processing unit; and
- a communication output unit which outputs a digital communication signal in which the main torque value and sub torque value converted by the AD converter and diagnosis information including the abnormality diagnosis results by the monitoring unit are superimposed.

2. The torque detection apparatus according to claim 1, wherein the torque sensor circuit further comprises a main output unit which outputs the analog main torque signal detected by the signal processing unit.

3. The torque detection apparatus according to claim 1, wherein the torque sensor circuit further comprises a sub output unit which outputs the analog sub torque signal detected by the signal processing unit.

4. The torque detection apparatus according to claim 1, wherein the communication output unit outputs the digital communication signal through a plurality of communication signal lines.

5. The torque detection apparatus according to claim 2, wherein the torque sensor circuit comprising:
- a correction use data storage unit in which data for correction of changing a processing circuit constant used in the signal processing unit and correcting an error of the analog main torque signal and the analog sub torque signal is writable; and
- an input/output switching unit which switches an output terminal for outputting the digital communication signal to the outside of the torque sensor circuit, to an input terminal for writing the data for correction from the outside of the torque sensor circuit to the correction use data storage unit.

6. The torque detection apparatus according to claim 3, wherein the torque sensor circuit comprising:
- a correction use data storage unit in which data for correction of changing a processing circuit constant used in the signal processing unit and correcting an error of the analog main torque signal and the analog sub torque signal is writable; and
- an input/output switching unit which switches an output terminal for outputting the analog sub torque signal to the outside of the torque sensor circuit to an input terminal for writing the data for correction from the outside of the torque sensor circuit to the correction use data storage unit.

7. The torque detection apparatus according to claim 1, wherein the communication output unit comprises:
- a diagnosis signal generating unit which generates a diagnosis signal including the main torque value and the sub torque value converted by the AD converter and the diagnosis information,
- a diagnosis signal output unit which converts a data format of the diagnosis signal generated at the diagnosis signal generating unit to output as the digital communication signal; and
- an output abnormality detection unit which compares the diagnosis signal generated at the diagnosis signal generating unit with a signal obtained by returning the digital communication signal obtained by converting and outputting the diagnosis signal by the diagnosis signal output unit to have the same data format as the diagnosis signal before conversion, and determines that an abnormality has occurred in the diagnosis signal output unit when a result of comparison does not match.

8. The torque detection apparatus according to claim 7, further comprising a diagnosis result output unit which outputs an output abnormality diagnosis result by the output abnormality detection unit.

9. The torque detection apparatus according to claim 7, further comprising an initial diagnosis unit which, before the torque detection function by the torque detection circuit operates, receives two different signals diagnosis, instead of the two signals compared by the output abnormality detection unit, and confirms that the output abnormality detection unit is operating normally by the output abnormality detection unit diagnosing the input signal for the abnormality.

10. The torque detection apparatus according to claim 9, wherein the signals for diagnosis are signals in which the diagnosis signal generated by the diagnosis signal generating unit and the digital communication signal obtained by converting and outputting an inverted signal of the diagnosis signal by the diagnosis signal output unit are returned to the same data format as the diagnosis signal before conversion.

11. The torque detection apparatus according to claim 7, wherein the diagnosis signal output unit is built into a custom IC, and
- further comprising a terminal abnormality detection unit which feeds back the digital communication signal output from the diagnosis signal output terminal of the custom IC, from a feedback terminal of the custom IC into the custom IC to compare with the digital communication signal before output from the diagnosis signal output terminal.

12. The torque detection apparatus according to claim 1, wherein the sensor unit comprises:
- a pair of detection coils in which impedances are changed in opposite directions to each other in accordance with a torque generated at the rotary shaft;
- a plurality of excitation signal generation units, each having an identical configuration, for generating excitation signals to be supplied to a bridge circuit comprising resistors serially connected to the detection coils;
- an excitation signal selection unit which selects any one of the plurality of excitation signals generated by the plurality of excitation signal generation units to supply to the bridge circuit; and
- an abnormality detection unit which compares the plurality of excitation signals generated at the plurality of excitation signal generation units to determine that an abnormality has occurred in an excitation signal when the plurality of excitation signals do not match.

13. The torque detection apparatus according to claim 12, wherein
- at least three of the excitation signal generation units are provided,
- the abnormality detection unit has a plurality of comparing circuits which compare the plurality of excitation signals generated by the excitation signal generation unit two by two and identifies an excitation signal at which an abnormality has occurred based upon the result of comparison by the comparing circuits, and the excitation signal selection unit selects a normal excitation signal based upon the excitation abnormality diagnosis results by the abnormality detection unit to supply to the bridge circuit.

14. The torque detection apparatus according to claim 12, further comprising an excitation signal initial diagnosis unit which, before the excitation signal generation function by the excitation signal generation unit operates, receives two different excitation signals for diagnosis instead of the two excitation signals compared by the comparing circuit of the abnormality detection unit to confirm that the abnormality detection unit is operating normally by the comparing circuit diagnosing the input signal for the abnormality.

15. The torque detection apparatus according to claim 12, wherein the abnormality detection unit comprises an excitation diagnosis result output unit which outputs an excitation abnormality diagnosis result.

16. The torque detection apparatus according to claim 12, wherein the sensor unit comprises an excitation signal terminal abnormality detection unit built into the custom IC, and
Further comprising an excitation signal terminal abnormality detection unit which feeds back the excitation signal output from the excitation signal terminal of the custom IC to the bridge circuit, from a feedback terminal of the custom IC into the custom IC to compare with the excitation signal before output from the excitation signal terminal to the bridge circuit.

17. The torque detection apparatus according to claim 16, wherein the excitation signal terminal abnormality detection unit comprises a terminal diagnosis result output unit which outputs an abnormality diagnosis result of the excitation signal terminal.

18. The torque detection apparatus according to claim 1, further comprising:
two pairs of the sensor units; and
two torque detection systems including the torque sensor circuits corresponding to the two pairs of the sensor units.

19. The torque detection apparatus according to claim 1, further comprising:
a pair of the sensor units; and
two torque detection systems including the torque sensor circuits, to detect the torque with any one of the torque detection systems being in an operating state.

20. An electric power steering system comprising:
a torque detection apparatus according to claim 1 which detects a steering torque input to a steering mechanism and
a motor control unit which controls driving of an electric motor to apply to the steering system a steering assistance force which reduces the steering load on the driver based upon the steering torque detected by the torque detection apparatus.

21. A vehicle comprising the electric power steering system according to claim 20.

* * * * *